(12) United States Patent
Johnson

(10) Patent No.: US 6,529,885 B1
(45) Date of Patent: Mar. 4, 2003

(54) METHODS AND SYSTEMS FOR CARRYING OUT DIRECTORY-AUTHENTICATED ELECTRONIC TRANSACTIONS INCLUDING CONTINGENCY-DEPENDENT PAYMENTS VIA SECURE ELECTRONIC BANK DRAFTS

(75) Inventor: Richard C. Johnson, Cupertino, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/405,741

(22) Filed: Sep. 24, 1999

Related U.S. Application Data

(63) Continuation-in-part of application No. 09/272,056, filed on Mar. 18, 1999.

(51) Int. Cl.$^7$ ................................................ G06F 17/60
(52) U.S. Cl. ................................ 705/64; 705/1; 705/26; 705/50; 705/70
(58) Field of Search ........................ 705/1, 26, 35, 705/37, 38, 50, 64, 70, 75

(56) References Cited

U.S. PATENT DOCUMENTS

| | | | |
|---|---|---|---|
| 4,725,719 A | * 2/1988 | Oncken et al. | ............ 235/487 |
| 4,903,201 A | 2/1990 | Wagner | |
| 5,262,942 A | * 11/1993 | Earle | ............... 705/37 |
| 5,265,008 A | * 11/1993 | Benton et al. | ............. 705/44 |

(List continued on next page.)

FOREIGN PATENT DOCUMENTS

| | | | |
|---|---|---|---|
| JP | 10-340302 | * | 12/1998 |
| WO | WO 0014648 A1 | | 9/1999 |

OTHER PUBLICATIONS

Anon2u.com, *The Way To Avoid Divulging Personal Or Financial Information To Multiple Websites While Shopping Online*, p. 1, World Wide Web (Printed on Jan. 29, 2001).

Anon2u.com, *The Service Options We Offer*, p. 1, World Wide Web (Printed on Jan. 29, 2001).

(List continued on next page.)

*Primary Examiner*—Edward R. Cosimano
(74) *Attorney, Agent, or Firm*—Young Law Firm, P.C.

(57) ABSTRACT

Disclosed herein are computer-implemented methods and systems for securely carrying out electronic transactions including electronic drafts, wherein payment on at least one of the drafts is contingent upon the removal of an associated contingency. The method may include steps of establishing a secure computer site accessible only by authenticated parties to the transaction and by any authenticated contingency approver. The site includes a representation of the transaction that includes a representation of each of the plurality of drafts and an option to remove any contingencies associated therewith. Parties and contingency approvers requesting access to the computer site are authenticated by encrypting identification information provided by the requesting party or contingency approver over a secure channel and successfully matching the encrypted identification information with an encrypted identifier that is stored by a bank, the encrypted identifier being unique to the requesting party or contingency approver. Payment on the constituent drafts of the transaction are released by the bank only when the option to remove each contingency associated with the draft is timely exercised by an authenticated party or authenticated contingency remover that is authorized to remove the contingency. Complex transactions may thereby be carried out securely, remotely and without compromising personal and/or financial information. The invention obviates the need to disseminate identification surrogates such as credit card numbers over public networks as well as the need to rely upon in-person holographic signatures on paper documents for authentication purposes.

45 Claims, 7 Drawing Sheets

U.S. PATENT DOCUMENTS

| | | | |
|---|---|---|---|
| 5,426,281 A | * 6/1995 | Abecassis | 235/379 |
| 5,590,197 A | 12/1996 | Chen et al. | |
| 5,644,727 A | * 7/1997 | Atkins | 705/40 |
| 5,677,955 A | 10/1997 | Doggett et al. | |
| 5,694,471 A | 12/1997 | Chen et al. | |
| 5,784,463 A | 7/1998 | Chen et al. | |
| 5,790,677 A | 8/1998 | Fox et al. | |
| 5,794,207 A | 8/1998 | Walker et al. | |
| 5,812,670 A | 9/1998 | Micali | |
| 5,845,265 A | 12/1998 | Woolston | |
| 5,898,777 A | 4/1999 | Tycksen, Jr. et al. | |
| 5,903,721 A | 5/1999 | Sixtus | |
| 5,987,440 A | 11/1999 | O'Neil et al. | |
| 6,029,150 A | 2/2000 | Kravitz | |
| 6,055,504 A | 4/2000 | Chou et al. | |
| 6,157,920 A | * 12/2000 | Jakobsson et al. | 705/69 |

OTHER PUBLICATIONS

Identrus, *The Identrus Solution—Overview,* World Wide Web, (Printed on Jan. 19, 2000).

Identrus, *The Identrus Solution—How Identrus Works,* World Wide Web.

Identrus, *The Identrus Solution—FAQ,* World Wide Web.

IEEE Spectrum, Feb. 1997, Special Issue on "Electronic Money", pp. 18–73 0018–9235/97.

Hiatt: "Point–and–Click Time–and–bill"; Computers in Accounting, Aug. 1992, v8, n6, p. 54–56.*

"Secure Electronic Transaction (SET)", Goizeta Business School, Fall 1997. emory.edu/Business/et/set.

* cited by examiner

METHODS AND SYSTEMS FOR CARRYING OUT DIRECTORY-AUTHENTICATED ELECTRONIC TRANSACTIONS INCLUDING CONTINGENCY-DEPENDENT PAYMENTS VIA SECURE ELECTRONIC BANK DRAFTS

The present application is a continuation in part of commonly assigned U.S. application Ser. No. 09/272,056 filed on Mar. 18, 1999.

BACKGROUND OF THE INVENTION

1. Field of the Invention

This invention relates to the field of electronic commerce (hereafter "e-commerce"). More particularly, the present invention relates to methods and systems for directory-authenticated electronic transactions including contingency-dependent payments via secure electronic bank drafts.

2. Description of the Related Art

The network of computers and networks commonly known as the Internet, initially developed as a military and academic communications tool, has now matured into a global communications medium. The explosive growth of the Internet, together with the increasingly ubiquitous availability of high bandwidth access thereto, has spurred efforts in adapting this medium for commercial purposes. The twin developments of the World Wide Web (hereafter "Web") and the software tools for navigating the Web known as "browsers" have been instrumental in facilitating popular acceptance of the buying and selling of goods and services on the Internet. Currently, a person wishing to buy goods and/or services on the Web (hereafter "Web buyer") must first find the Universal Resource Locator (hereafter "URL") of the merchant of interest (hereafter "Web seller"), typically using a search engine or a portal. Alternatively, the user may learn the URL of a seller from an advertisement or may store the URL obtained through whatever source and visit the seller site directly without going through a portal or search engine. Thereafter, the Web buyer must navigate to the Web seller's Web site, using his or her Web browser. After selecting the product the Web buyer wishes to purchase, the Web buyer is typically invited to fill out a lengthy electronic form on the Web seller's site. Such electronic forms usually request personal and confidential information, including at least the user's name, address, telephone numbers, email address, and credit card information. Often, the Web buyer is requested or invited to select a personal and unique identification tag (hereafter "ID") and a password. Such ID and password pairs may then allow the Web buyer to bypass much of the data entry in the Web seller's electronic form upon his or her next visit to the Web seller's site. This, however, entails that the Web seller collects and stores the personal and billing information for each Web buyer. Although the majority of Web sellers may carefully secure and safeguard this wealth of personal information, the possibility exists that such information may be used for purposes other than originally contemplated by the Web buyer. Credit or charge card information is particularly sensitive to fraud and misuse. Indeed, a stolen (or misappropriated) but otherwise valid credit card number may be fraudulently used to purchase goods or services over the Web, due to the lack (or widely disparate nature) of security measures deployed by Web sellers to prevent such credit or charge card fraud. Such fraud is detrimental to all involved parties, including the credit card issuers, the Web buyers and the Web sellers, who must expend time and energy processing buyer complaints. The financial loss from credit card affects both credit card issuers as well as the buyer; the major loss, however, may be experienced by the merchant who has parted with the goods and has had the charge disallowed by the credit card issuer. For the merchant, this loss is a major disadvantage in the use of credit cards for e-commerce.

However, it is not only the Web buyer's credit card information that may be stolen. Potentially far more damaging is the possibility of what may be called identity theft, the misappropriation and misuse of a person's personal and financial information. The specter of identity theft is looming ever larger, as these Web-based electronic forms provide a pre-packaged, one-stop shopping source of highly detailed confidential information to unscrupulous individuals having access thereto. Although the vast majority of Web sellers are honorable and have established procedures aimed to thwart identity theft, the sheer proliferation of Web sellers on the Internet virtually ensures that such thefts will become increasingly commonplace.

Perhaps less actionable (but just as frustrating) is the possibility of what may be termed "identity confusion". Here, one person may be confused for another and their respective personal information may be substituted or merged with one another. For example, a Web seller or credit agency may mistakenly merge two records of two identically named but separate persons. Again, this problem can only be exacerbated by the proliferation of Web sellers on the Internet, each requesting, warehousing and perhaps mining and/or selling the personal and financial information obtained from their Web buyers.

This proliferation of Web sellers also means that Web buyers are repeatedly requested to select a great many separate ID's and passwords pairs, one for each Web seller. It may become difficult, therefore, for the Web buyer to remember these ID-password pairs and/or to associate a particular ID-password pair with a particular Web seller. Some Web buyers resort to selecting a single ID-password pair and using that single ID-password pair for all of the Web sellers with whom they conduct business. This, however, is a less than satisfactory solution, as such Web buyers are more vulnerable to fraud should the single ID-password pair be misappropriated.

The perceived lack of security, simplicity and homogeneity in the data collection across Web sellers operate as barriers to entry into e-commerce, discouraging many potential buyers from purchasing goods and services on line. Web buyers, therefore, have an interest in promoting simple, homogeneous and secure Web-based transactions. What are needed, therefore, are methods and systems that allow financial transactions to be carried out on the Internet or other network in a manner that is simple, homogeneous across Web sellers and conducted in a manner that ensures the integrity and security of the Web buyers' personal and financial information.

The interests of Web sellers are generally aligned with those of their buyers, in that Web sellers have an interest in promoting simple and secure e-commerce, so as to attract the greatest possible number of buyers to their site. If an alternative to the indiscriminate collection of buyer's personal and financial information is to be implemented, Web sellers must be confident that they will be indeed paid for the goods or services they provide. What are needed, therefore, are methods and systems that will promote the interests of Web sellers and provide them with the complete assurance that they will be paid for the goods and services sold from their Web sites in a timely manner.

Curiously enough, banks thus far have not been an integral party to Web buyer—Web seller transactions.

Indeed, although the money is ultimately debited from the Web buyer's bank account, or charged to his or her credit or charge card, the buyer's bank or other financial institution has not typically been actively involved in e-commerce transactions, as such transactions are conventionally structured. What are also needed, therefore, are methods and systems that include financial institutions such as banks as integral and central participants in e-commerce transactions.

Simple transactions involving a single buyer making an unconditional payment or an unconditional promise to pay a single seller, however, constitute only a fraction of the transactions that are routinely carried out. For example, many transactions involve contingent payments of some kind. Indeed, many transactions include built-in contingencies that must be met before goods or title will change hands or obligations released. Contracts for the purchase of real estate, for example, are complex transactions that typically involve the release of multiple contingencies (passing inspections, obtaining financing, carrying out improvements and other generally date-sensitive duties of both buyer and seller). Such transactions have historically been centered around holographic signatures on paper documents. Indeed, in the case of a contract for the sale of land, the buyer (and sometimes the seller) typically must repeatedly visit the escrow agent's place of business to release contingencies and/or make payments as the contingencies are met and/or released. Alternatively, a single document may be repeatedly transmitted via facsimile for signature, ultimately rendering the final document nearly illegible and potentially subject to repudiation.

Other contingent payment schemes may rely upon other insecure schemes that may also be liable to repudiation. For example, a stockbroker will accept an order to buy or sell securities or other instruments over the telephone on the presumption that the order comes from a known customer. The transaction is consummated and both documentation and payment follow by mutual agreement as "settlement", a predetermined period after the order is filled (e.g., five days). In this scenario, the customers operate based upon the assumed good faith on the broker and the broker operates on the assumed good faith of his or her customers. Such an interaction model, however, is fraught with possibilities for abuse and may expose both parties to significant liability.

Web-based brokerage, increasingly common at the present time, allows buy-sell orders over the Web on authentication of the client; this is an improvement over the phone-voice method, but no single sign-on mechanism is presently available and the Web brokerage client must select an ID and password for each broker with whom the client deals. As with other conventionally structured Web transactions, this proliferation of IDs and passwords may operate as a barrier to entry and prevent widespread acceptance of such e-commerce businesses.

Auction escrow arrangements for Web auctions are conventionally handled primarily by means of credit cards. Some on-line auction Web sites require participants to supply their credit card numbers to establish authentication. Independent escrow companies typically require credit card payments, which payments are held in escrow pending release of a timed contingency or by a specific action by the purchaser. Other examples of contingent payments include inter-company payments, especially payments from one e-business to another e-business. Such payments are typically carried out with conventional paper instruments or credit cards, neither solution being truly satisfactory. Many transactions require both spouses to physically sign a paper instrument. The inconvenience of requiring each spouse to physically go to a specified location for the sole purpose of holographically signing off on (releasing) a contingency or co-signing a paper check, contract or other instrument often tacitly encourages spousal forgery. However, such forgeries may also lead to repudiation of the instrument by the bank or escrow agent, notwithstanding the most often benign nature of the spousal forger's intent. Presently, these and other contingent payments are generally handled entirely in paper format with holographic signatures. Electronic conversion of such contingency-containing transactions awaits viable methods of securely authenticating parties to contingency-containing transactions.

Such methods should provide ease of use, security and positively identity the buyer(s) and seller(s) of contingency-based payment or other contingency-containing transactions. Preferably, such methods should not resort to using credit card numbers and/or and social security numbers for identification and/or for authentication, as many consumers are understandably reluctant to broadcast such information, particularly over public networks such as the Internet. Preferably, such methods should allow remote authentication of all parties to a transaction and allow such parties to view the status of and/or release or reject any contingency (depending upon the permission level granted to that individual) within the transaction. Preferably, such methods should asynchronously notify all authenticated parties to the transaction upon completion or failure (and/or any intermediate stage(s)) of the transaction, such as when final payment has been credited to seller or when any contingency is rejected by any party to the transaction.

SUMMARY OF THE INVENTION

It is an object of the present invention, therefore, to provide methods and systems that allow financial transactions to be carried out on a network such as the Internet in a manner that is simple and that ensures the integrity and security of the buyer's personal and financial information. It is also an object of the present invention to provide e-commerce methods and systems that include financial institutions such as banks or other trusted parties such as governmental agencies or corporations as integral and central participants in Web-based and like transactions. A further object of the present invention is to provide methods and systems for remote and secure authentication of parties to contingency-based transactions, thereby obviating the need for obtaining holographic signatures on paper documents to release contingencies. It is a still further object of the present invention to provide an infrastructure allowing complex transactions to be securely consummated by remote participants.

Accordingly, a computer-implemented method of carrying out an electronic transaction that includes a contingency-dependent payment via a secure electronic draft, according to an embodiment of the present invention, comprises a step of establishing a secure computer site that is controlled by a bank and that is accessible only to authenticated parties to the transaction, the site being configured to provide a description of a contingency and to include an option to remove the contingency, the removal of the contingency being a precondition to the bank releasing payment on the draft to a payee of the draft. Each party to the draft requesting access to the computer site is authenticated by encrypting at least a portion of an identification information provided by the requesting party over a secure channel and successfully matching the encrypted identification information with a stored encrypted identifier that is unique to the requesting party. Payment on the draft is released to the payee only when a drawer of the draft is successfully authenticated by the bank and when the option to remove the contingency is timely exercised by an authenticated party that is authorized to remove the contingency.

According to further embodiments, steps may be carried out to electronically notify each party to the transaction of their requested participation in the transaction, and to cancel the transaction unless each party to the transaction accesses the computer site, acknowledges receipt of the electronic notification, is authenticated and indicates their willingness to participate in the transaction. A fee may be assessed upon at least releasing payment and canceling the transaction. All fees may be paid according to agreements between the bank and the parties involved. Each encrypted identifier may include an ID and encrypted password pair, the pair being stored in a data structure controlled by the bank and managed by Directory software. Each encrypted identifier is preferably stored only by a single bank. The identification information for each party to the transaction may include an ID for that party and an identification of the bank in which the encrypted identifier for that party is stored. The bank in which the encrypted identifier is stored may further carry out the steps of requesting a password corresponding to the provided identification information, encrypting the requested password and matching the ID and encrypted password with a stored encrypted identifier. The authenticating step may authenticate the party to the draft only for a session of limited duration. The drawer's encrypted identifier may be linked to the drawer's financial information stored by the bank and the bank may access the stored financial information prior to the releasing step and may withhold payment on the draft when insufficient funds or credit are available or when agreed transaction limits are exceeded. The parties to the transaction may access the secure computer site over a Virtual Private Network on the Internet.

The present invention may also be viewed as a computer-implemented method (or a machine-readable medium having data stored thereon representing sequences of instructions which, when executed by one or more computers coupled to a secure network, causes at least one of said computers to perform the method) of securely carrying out an electronic transaction including a plurality of electronic drafts, a payment on at least one of the drafts being contingent upon removal of an associated contingency. Such a method includes a step of establishing a secure computer site that is controlled by a trusted entity and that is accessible only by authenticated parties to the transaction and by any authenticated contingency approver, the site being configured to provide a representation of each of the plurality of drafts and an option to remove any contingencies associated therewith. The parties and any contingency approver requesting access to the computer site are authenticated by encrypting at least a portion of an identification information provided by the requesting party or contingency approver over a secure channel and successfully matching the encrypted identification information with a stored encrypted identifier, the stored encrypted identifier being unique to the requesting party or contingency approver. Payment on a draft of the plurality of drafts is released only when a drawer of the draft is authenticated and when the option to remove each contingency associated with the draft is timely exercised by an authenticated party or authenticated contingency remover that is authorized to remove the contingency.

The transaction may be cancelled unless payment is timely released on each of the plurality of drafts and each of the contingencies of the transaction is removed by an authenticated party or contingency remover. The authentication step may include a step of granting a permission level and wherein all or a selected portion of the representation of the transaction at the computer site is viewable to each authenticated party or contingency approver, depending upon the permission level granted. The trusted entity may include an entity having a financial and fiduciary relationship with at least one of the parties to the transaction, such as a bank. Preferably, the identification information is unrelated to data associated with a payment instrument, such as a credit card number (unless previously agreed by the respective parties to the transaction and the trusted entity, such as the bank).

According to a further embodiment, the present invention is a method of carrying out secure electronic transactions over the Internet. The method includes a step of establishing a secure network linking a plurality of participating banks and storing an encrypted identifier for each participating account-holding customer in a customer's home bank, the customer's home bank being that bank of the plurality of banks in which the customer maintains an account. Each encrypted identifier is linked to the customer's account. Each customer having caused an electronic draft to be presented to one of the plurality of banks is required to be authenticated prior to releasing payment on the draft, a customer being authenticated when identification information presented by the customer matches the encrypted identifier stored at the customer's home bank, the encrypted identification information including an identification of the customer's home bank.

The identification information may include a customer ID and the method may further include the step of storing a local master list at each of the plurality of banks, the local master list stored at each bank including the ID of each customer having presented the identification information to that bank and the identification of the customer's home bank. The method may further comprise the step of forwarding the identification presented by the customer to the customer's home bank over the secure network for authentication when the bank to which the identification information is presented is other than the customer's home bank. The draft may include a contingency, a timely removal thereof by an appropriate authenticated party to the transaction being a precondition to the release of the payment on the draft. A secure computer site controlled by one of the plurality of banks may be established, the secure computer site being accessible only to authenticated parties to the transaction and including a representation of the transaction and an option to remove the contingency.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

FUNCTIONAL OVERVIEW

Figure 1A:
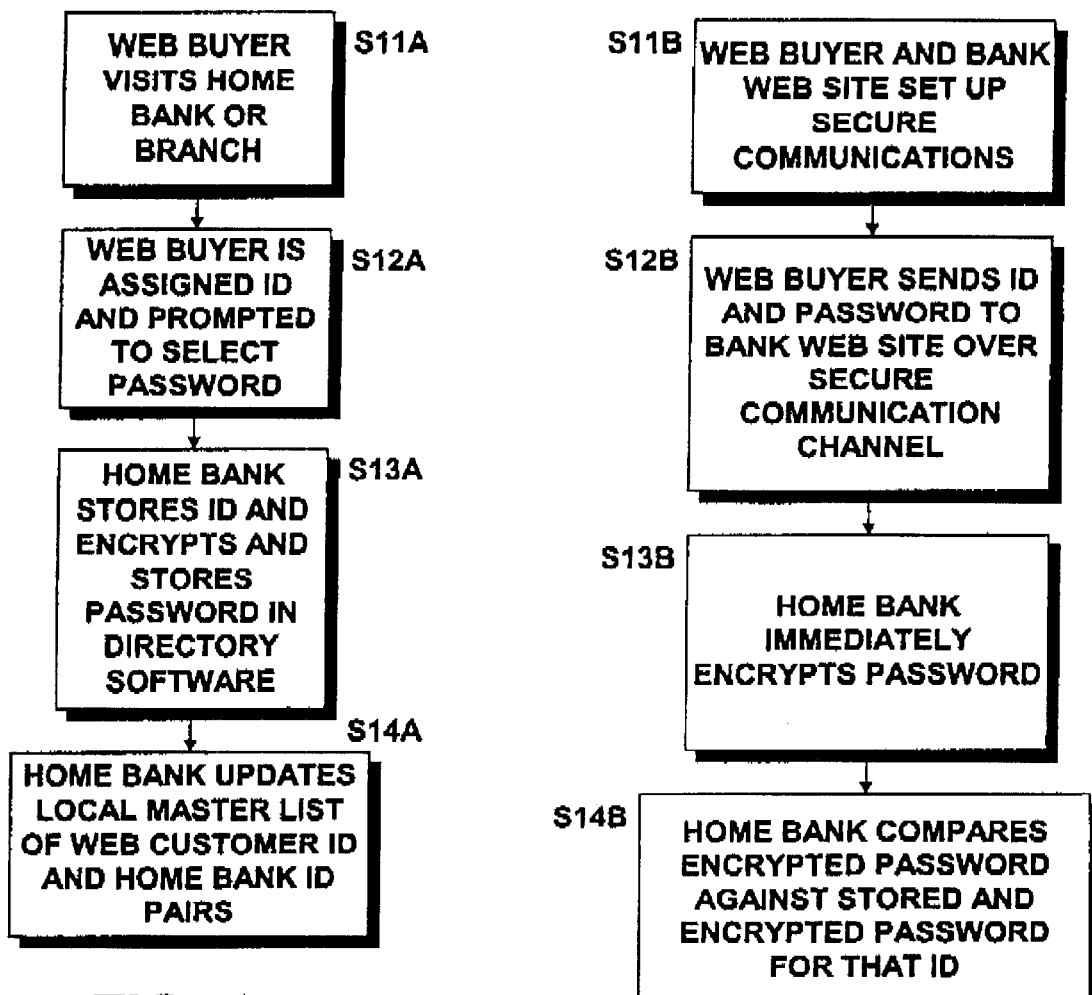
FIG. 1A is a flowchart illustrating an aspect of an embodiment of the present invention, wherein a Web buyer signs on with his or her home bank to participate in the Directory-authenticated bank draft system (the "iDraft™" system).

The present invention solves many of the problems inherent in conventional e-commerce schemes; notably the dissemination of personal and/or financial information across unsecured networks and to diverse Web sellers, transactional security, the need to repeatedly re-enter personal information and the dangers of identity theft and identity confusion, to name a few. According to the present invention, only a limited number of entities (and preferably only one such entity) hold the Web buyer's personal and/or financial information, such as bank account numbers and credit/charge card numbers. Preferably, the entity to hold such information is an entity that already enjoys a fiduciary relationship or a trusted relationship with the prospective or existing Web buyers, such as the Web Buyers' bank or banks, credit card holders, etc. In this manner, none of the Web sellers (or fewer Web sellers, in the case wherein customers knowingly and voluntarily add this information to a transaction) hold or have access to the Web buyers' personal and/or financial information, such as account numbers, credit card numbers, passwords and the like.

The present invention allows e-commerce to be carried out, if desired, without recourse to credit or charge cards while maintaining a high degree of security for the Web buyer and a high degree of reliability for the Web seller (Web sellers, within the context of the present invention, includes not only retailers offering goods and services over the Web, but also anyone person or entity utilizing the Internet as a communication and transactional medium to conduct business and to transfer funds). Indeed, the present invention allows drafts to be executed by the Web buyer over the Internet (or some other public, private or Virtual Private Network (hereafter VPN)) and presented by the Web seller's installation of appropriate bank-provided software to the Web buyer's financial institution for payment, in much the same manner as with checks (a specific form of a draft). However, unlike checks, the execution, presentment and payment thereof may be carried out, according to the present invention, in electronic form and without the intermediary of check clearinghouses that form an integral part of negotiating a conventional "paper" check.

Using generally accepted legal terms, a draft is a written order by a first party, called the drawer, instructing a second party, called the drawee, to pay money to a third party, called the payee. In terms of e-commerce and the present invention, the Web seller may be thought of as the payee, the Web buyer may be thought of as the drawer and the financial institution, such as the bank, may be thought of as the drawee. Herein, the terms "financial institution" and "bank" are used interchangeably and shall be understood to include all financial services institutions accepting deposits of cash, negotiable securities, marketable shares/stock into numbered (or otherwise uniquely-identified) accounts and honoring checks, drafts and/or other customer instructions. Such a definition includes (but is not limited to) traditional banks and savings institutions, stockbrokers, online trading concerns, credit unions and any institution that legally identifies with and has some financial relationship with an account holder and that has the ability to honor customer or account holder instructions referring to specific accounts. The applicability of the present invention extends also to such institutions as post offices or other governmental agencies that carry out banking or quasi-banking functions, assuming that such institutions and agencies maintain numbered (or otherwise uniquely identified) accounts and require proof of identity similar to that required at banks; namely, in person signature to set up the numbered account at the institution and agreeing to the terms of service for participation in the system according to the present invention. The Internal Revenue Service (IRS) may be thought of as another example of such a governmental agency.

Since a draft may also be thought of as an unconditional promise to pay money to the order of the payee, the drawee (such as the bank and/or other financial institution) has a great interest in properly authenticating (positively verifying the identity) of the drawer of the draft. Indeed, the bank (and typically not the account holder) may be obligated to bear the loss in cases wherein an improper authentication has been made. The primary means of authenticating the drawer of a conventional paper-based draft (a check, for example) is the drawer's signature, an exemplar of which is typically stored in a card file within the bank. Instead of a signature, an embodiment of the present invention contemplates the use of identifying information such as an identification string and password pair and/or biometric data. The biometric data may include any physical characteristic that distinguishes one drawer from all others, such as fingerprints, retinal scans and/or voiceprints, for example. An illustrative embodiment of the present invention is disclosed below wherein the identification information includes the identification string and password pair, it being understood that other identification information (such as biometric data, for example) may be substituted therefor or used in conjunction therewith without departing from the scope of the present invention.

The identification string (hereafter "ID") preferably includes both alphabetical and numerical (alphanumerical) characters and uniquely identifies the draft drawer (such as a Web buyer) from other drawers. The bank may conduct tests to ensure the uniqueness of the ID. Likewise, the password also preferably includes alphanumeric characters. The ID may, according to an embodiment of the present invention, be assigned to the Web buyer, whereas the password is preferably selected by and known only to the participating Web buyer, to the exclusion of all others, including the drawee (such as the bank) and the payees (such as the Web sellers). To insure that the selected passwords remains known only to the Web buyer, the selected password is preferably immediately encrypted upon receipt thereof and stored by the bank only in its encrypted form. This may protect the bank from claims of misappropriation of the Web buyer's password and ID. Embodiments of the present invention are explained in detail with reference to FIGS. 1A through 8.

As shown in FIG. 1A, the Web buyer may initiate the method according to the present invention by visiting his or her home bank or branch office to give signed authorization to participate in the iDraft™ system according to the present invention, as shown at step S11A. Alternatively, the Web buyer may log onto his or her home bank Web site (or other equivalent bank presence on a public or private network), although some banks may prefer or require the Web buyer to physically visit the bank or branch to fill out the necessary paperwork and obtain an in-person holographic signature. A Web buyer's home bank may be the Web buyer's broker or savings institution, or may be that bank at which he or she maintains a checking account, for example. Preferably, the Web buyer and the Web buyer's home bank, when connected over the Web, establish a secure communications channel using some agreed upon and standardized protocol, such as the Secure Socket Layer (hereafter "SSL") protocol (incorporated herein by reference), for example. SSL utilizes an encryption scheme (such as a public key encryption scheme, for example) that is negotiated at the time of the communication and helps to ensure that electronic eavesdroppers between the Web buyer and the Web buyer's home bank cannot intercept any clear, unencrypted communication. Such an SSL may be negotiated between the Web buyer's Web browser software, for example, and the World Wide Web server of the Web buyer's home bank. Once the Web buyer has reached his or her home bank's Web site (or physically visited the bank and authorized participation in the iDraft™ system according to the present invention), the Web buyer may be assigned an ID and prompted to select a password after filling out any appropriate paperwork or entering the requisite identification information in the fields supplied at the Web buyer's home bank Web site, as outlined at step S12A. Alternatively, the Web buyer may select both ID and password, be assigned both ID and password, or any permutation thereof. The Web buyer's home bank then stores the assigned ID and encrypts the password, as shown at S13A. Preferably, the encryption of the Web buyer's password at the Web buyer's home bank is different than the encryption scheme inherent in the SSL. The encrypted password is then stored within the Web buyer's home bank's server or other storage device. The home bank's (e.g., Java language) software may use the Web Buyer's browser software to establish certificates or other security features on the Web Buyer's computer. The home bank may also take other steps to insure that viruses or other potentially harmful agents do not affect the security of these transactions.

By immediately encrypting the Web buyer's password without storing or having access to the clear, non-encrypted version thereof, the Web buyer's home bank insures that the Web buyer's unencrypted password remains known only to the Web buyer. Thus, even the Web buyer's home bank does not know the un-encrypted, clear password selected by the Web buyer. According to an embodiment of the present invention, only the Web buyer's home bank (to the exclusion of all other banks and the Web seller) knows and/or has access to the Web buyer's encrypted password. As shown in step S14A, the home bank, according to an embodiment of the present invention, may then update a local master list. The master list, according to an embodiment of the present invention, may include a list of Web buyers identified by their ID and an identification of the Web buyers' home bank.

Figure 1B:
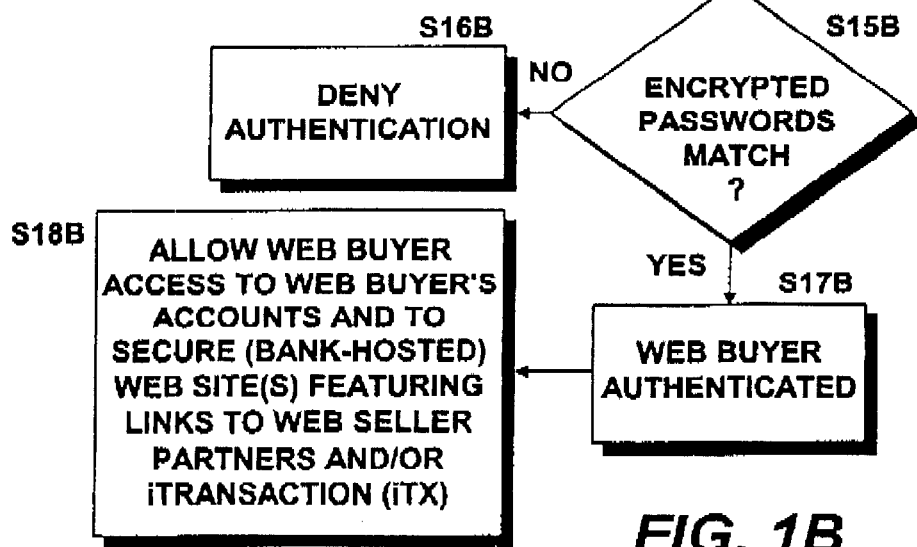
FIG. 1B is a flowchart illustrating another aspect of an embodiment of the present invention, depicting the steps taken by the Web buyer's home bank to authenticate the Web buyer to the Web seller or to allow the Web buyer to access participating Web sellers Web sites from the bank's Web site or portal.
Figure 2:
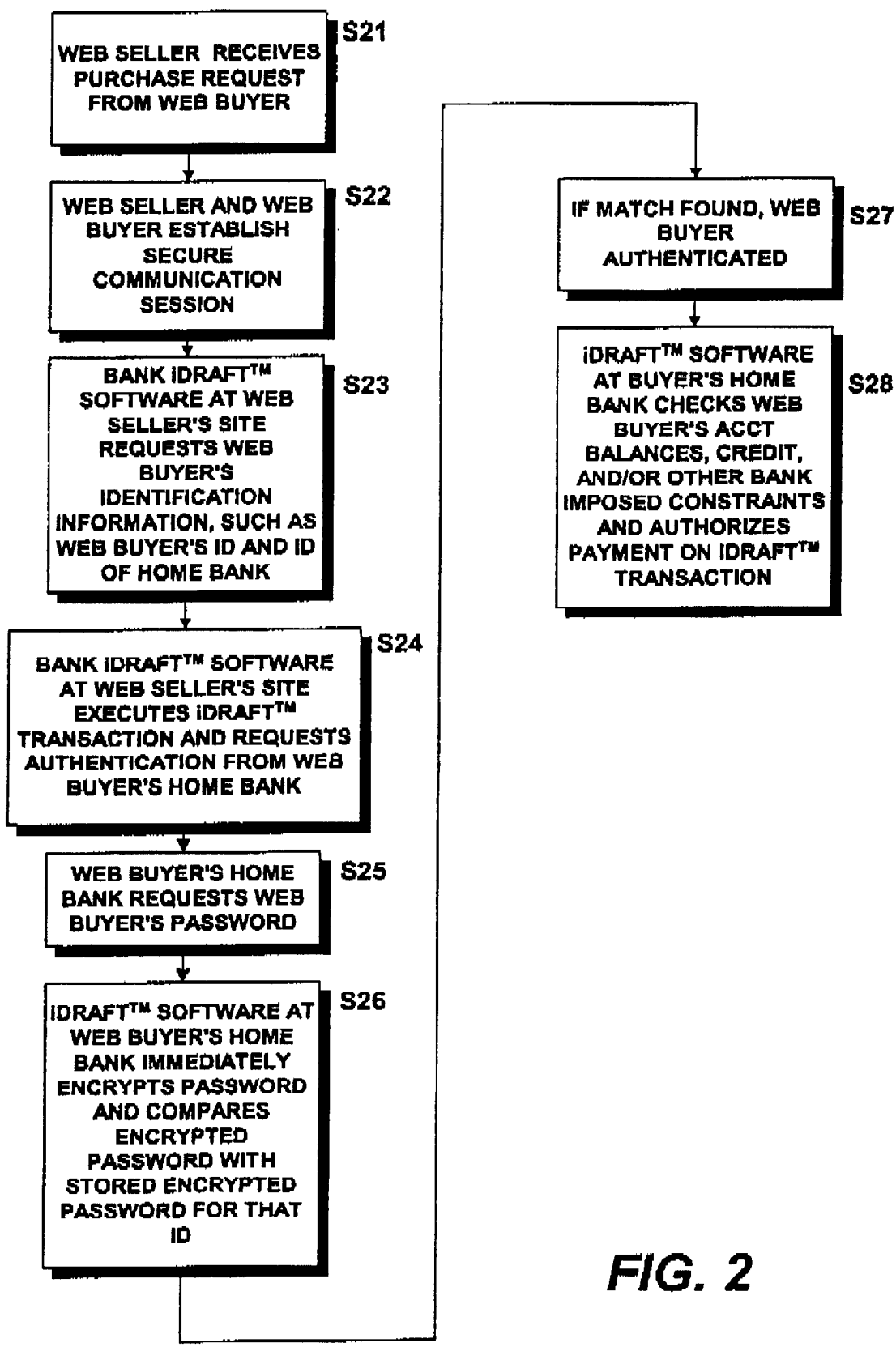
FIG. 2 is a flowchart illustrating another embodiment of the present invention.

FIG. 1B is a flowchart illustrating a further aspect of the present invention, and depicts steps that may be taken by a Web buyer's home bank to authenticate a Web buyer wishing to purchase goods or services from a Web seller accessed through the bank's Web site. In step S11B, a Web buyer and his or her home bank establish secure communications, such as via an SSL (for example) negotiated between the Web buyer's Web browser software and the Web buyer's home bank's Web server. Having accessed his or her home bank's Web site, the Web buyer may be prompted to enter his or her ID and password (and/or other biometric data, for example), over the secure communication channel between the Web buyer's home bank's server and the software (such as a Web browser) installed on the Web buyer's personal computer, network computer or other network- or Web-enabled device or appliance, as outlined in step S12B. The ID and password, transmitted over the secure communication channel, are then received by the Web buyer's home bank's server. The Web buyer's bank's server may then utilize the received Web buyer's ID to access the record associated with that ID. The record associated with the received ID preferably contains (or points to) the previously encrypted and stored password for that ID. The previously encrypted and stored password for that Web buyer is then retrieved. The password received from the Web buyer is immediately encrypted by applying thereto an encryption scheme that is identical to that encryption scheme originally used to encrypt the Web buyer's password upon first selection thereof, as shown in step S13B. The two encrypted passwords are then compared, as shown in FIG. 1B at steps S14B and S15B. If the two identically encrypted passwords do not match, the Web buyer is not authenticated by the Web buyer's home bank, as shown at S16B. An appropriate message may then be generated and sent to the Web buyer prompting him or her to re-enter the ID and password, or to carry out some other action. If the two encrypted passwords match, the Web buyer is authenticated (step S17B), meaning that the Web buyer's identity has been verified to the satisfaction of the entity that bears the risk of lost; namely, the Web buyer's home bank. The Web buyer may then, according to an embodiment of the present invention, be given access to his or her accounts at the home bank as well as access to the home bank's secure Web site or to secure Web sites hosted by the bank for example. Such secure Web sites may include, for example, a payee (Web seller) list including, for example, Universal resource Locators (URLs) or some other network-relevant addresses or links to those Web sellers with whom the home bank has a partner relationship, meaning those Web sellers that participate in (and agree to be bound by the terms of) the iDraft™ system according to the present invention, as shown at step S18B. Once authenticated, the Web buyer may remain authenticated for the length of the current session, as long as the Web buyer remains within the Web buyer's home bank's Web site or within Web sites of Web sellers accessed through the bank's Web site and/or with whom the bank has established a partner relationship. Once the Web buyer leaves such Web sites, he or she is no longer authenticated and must be re-authenticated should he or she wish to have an electronic bank draft executed and honored by his or her home bank. Appropriate software provided by the bank to the respective Web sellers will cooperate with the Web buyers' browsers to carry out these functions and features.

The secure home bank's Web site, in this manner, may function as a value-added portal, meaning as a jump station from which authenticated Web buyers may transfer to selected Web seller Web sites. Within the context of the present invention, any network appropriate identifier may be substituted for the term "Web", as the present invention has broader applicability than applications relating solely to the Internet or to the World Wide Web. Having transferred to the Web site of one of the featured Web sellers, the authenticated Web buyer may purchase goods and/or services, and cause one or more bank drafts to be executed as payment therefor. As the Web buyers accessing the Web sellers' Web sites from the home bank's Web site are already authenticated, the Web sellers may be confident that drafts executed by such authenticated Web buyers will be, in fact, honored (paid) by the Web buyer's home bank. Such drafts are preferably presented to the home bank by the Web seller in electronic and encrypted form, in a manner similar to that utilized by the Web buyer in establishing secure communications with his or her home bank, for example.

The home bank, upon receiving and encrypting the Web buyer's password, may retrieve not only the Web buyer's (the draft drawer's) identity, but may also retrieve other financially relevant information. Such other financially relevant information may include, for example, the balance in the Web buyer's relevant accounts, his or her credit and/or predetermined spending limits. The home bank may then establish constraints based on the retrieved financial information. For example, although the Web buyer may be properly authenticated to the bank's satisfaction, the home bank may not honor a draft presented to it by a Web seller, if the amount to be drawn exceeds the finds available for withdrawal in the Web buyer's relevant account(s), lines of credit, cash reserve, credit or charge cards and the like. In this manner, the home bank will honor a draft presented by a payee with whom the drawee has a partner relationship only when the drawer of the presented draft is authenticated by drawee and when the constraints established by the drawee are satisfied. Such constraints may have been previously negotiated and agreed upon by both the bank and the Web buyer or may be fixed by the bank, which may condition participation in the iDraft™ system upon acceptance of such fixed constraints.

Preferably, the home bank stores the Web Buyer's ID, encrypted password and other relevant financial and personal information in a data structure managed by Directory software, as shown in the previously-discussed step S13A of FIG. 1A. Directory software typically includes a repository (e.g., a list or database, for example) of names, permissions, resources, hardware, software and hierarchical information and/or rules within a network. The phrase "Directory software", according to the present invention, encompasses any software including or managing such a repository that is designed to operate on computers coupled to a network. For example, the home bank may store the above-listed information in a Directory software compatible with and accessible through Directory access software, such as Directory access software compatible with the X.500 Directory Access Protocol (DAP), which protocol is incorporated herein by reference, or a subset, extension or variant thereof. One such subset of DAP is the Lightweight Directory Access Protocol or LDAP. For example, the Web buyer's home bank may implement Oracle Internet Directory™ (OiD™) software (or upgrades/variants thereof), a software product developed by the assignee of the present invention. OiD™ combines a native implementation of the Internet Engineering Task Force's (IETF) LDAP v3 standard (also incorporated herewith in its entirety by reference) with, for example, an Oracle8 (or later implementation) back-end data store. In like manner, the Web buyer's home bank may store the above-detailed information within a Directory software compatible with the LDAP v3 (or later versions) protocol, such as the above-identified OiD™ software from Oracle Corporation. Alternatively, other Directory software may be used for this purpose, such as Novell Directory Services™ (NDS™) of Novell, Inc.

To insure transactional security, each bank that participates in the iDraft™ system according to the present invention maintains control over the financial information of its participating account holders, whether buyers or sellers. This keeps the account holders' financial information where it belongs: within his or her home bank and not with the merchants he or she patrons. In turn, each iDraft™ bank may be responsible to an iDraft™ Association, which may be formed as an oversight and standard-setting organization to monitor the iDraft™ activities of each participating bank and to administer the common rules that each iDraft™ bank agrees to follow.

According to the present invention, an iDraft™ bank (at least the Web buyer's home iDraft™ bank and possibly also the Web seller's iDraft™ bank) always intermediates between buyers and sellers. Indeed, no seller may authenticate a buyer, unless the seller is also an iDraft™ bank. In that case, the buyer may also be an account holder of the iDraft™ bank who has iDraft™ privileges. For example, the bank may sell (via an iDraft™ transaction) printed checks, for example, to its iDraft™ buyer and account holder. All parties to an iDraft™ transaction must be member of the iDraft Association, either on their own account(s) or through agreements with their iDraft-member banks FIG. 2 outlines another aspect of the present invention, wherein a Web buyer is authenticated after accessing a Web seller's site, in contradistinction to FIG. 1B, wherein the Web buyer is authenticated by first logging onto his or her home bank's Web site and being authenticated by his or her home bank's iDraft™ software. As shown in step S21, a Web seller receives a purchase request from a Web buyer. For example, a Web buyer may be logged on the Web seller's Web site via a personal computer or other Web-enabled device, may have selected goods for purchase and may be ready to conclude his or her purchase. Alternately, the Web buyer may just have logged onto the Web seller's site and may be requesting to be authenticated, to gain access to specially featured goods or services, or to gain access to an area in the Web seller's site that may be reserved for authenticated Web buyers, for example. The Web buyer and the Web seller may then establish a secure communication channel conforming, for example, to the SSL protocol (or some other secure and standardized protocol), as shown in step S22. According to step S23, the bank iDraft™ software at Web seller's site (maintained and controlled—or caused to be maintained and controlled—by a participating iDraft™ bank, such as the Web seller's home bank, for example) may then request the Web buyer's identification information. Such identification information includes the Web buyer's ID, may include the identification of the Web buyer's home bank (if this is the first time the Web buyer has made a purchase from this Web seller), selected biometric data and/or other security information requested by the Web buyer's home bank. The identification information, however, does not include the Web buyer's password, as such is communicated only to the Web buyer's home bank. The identification information may be sent over the secure communication channel established in step S22 between the Web buyer's Web-enabled device (such as a personal computer, for example) and the Web Seller's server. As shown in step S24, the bank iDraft™ software at Web seller's site receives the Web buyer's identification information and executes an iDraft™ transaction. Before, the iDraft™ transaction is honored by the Web buyer's home bank, however, the Web buyer must be authenticated. For that purpose, the iDraft™ software at the Web seller's site connects the Web buyer (through his or her browser software, for example) with his or her home bank (accessed by means of the identification thereof provided by the Web buyer), again via a secure communication channel. As shown in step S25, the iDraft™ software of the Web buyer's home bank requests the Web buyer's password from the Web buyer. As shown in step S26, the Web buyer's password is then immediately encrypted using an encryption scheme that is identical to the encryption scheme originally used to store the Web buyer's chosen or assigned password. The Web buyer-provided password, therefore, is immediately encrypted within the iDraft™ software at the Web buyer's home bank in a manner that is wholly transparent to the Web buyer. Although there may be a short period of time (on the order of nano- or milliseconds) between the receipt of the unencrypted, clear password from the Web buyer and its later encryption, the unencrypted password is never accessible to or displayed by the Web seller or the Web buyer's home bank, their employees or other individuals. As also shown in step S26, the Web buyer's home bank then compares the encrypted password with the previously stored and encrypted password corresponding to the ID provided by the Web buyer in step S23.

The identification of the Web buyer's home bank may, for example, be the stock market's symbol for the bank, which may point to the URL of the Web buyer's home bank's secure Web site. Moreover, the identification of the Web buyer's home bank and the Web buyer's ID may be combined to create a unique bank and customer ID. The iDraft™ transaction to be authenticated, therefore, may include an identification of the Web buyer's home bank, the Web buyer's ID, the amount of the purchase as well as an identification of the Web Seller. The authentication of the iDraft™ transaction may be made over a VPN between the iDraft™ software at the Web seller's site and the iDraft™ software at the Web buyer's home bank. The parameters of the VPN may be negotiated and controlled by the respective iDraft™ software at the Web seller's site (controlled and maintained by the Web seller's iDraft™ bank) and the iDraft™ software at the Web buyer's home bank.

Returning now to FIG. 2, if it is determined that the two encrypted passwords match (and correspond to the proper ID), the Web buyer may be authenticated, as shown at Step S27. The Web buyer's home bank may wish to check the now-authenticated Web buyer's current account balances or credit limits before authorizing or releasing payment on the iDraft™ transaction presented to it by the Web seller, as shown in step S28. Once payment is released, the Web buyer's account is debited for the amount of purchase (plus any applicable iDraft™ fees from the Web buyer's home bank and/or the Web seller's bank) and the Web seller's account is correspondingly credited for the amount of purchase. Alternatively, a selected payment instrument may be charged with the purchase, as arranged between the Web buyer's home bank and the Web buyer. The Web seller, in this manner, is assured that the Web buyer's home bank will not repudiate the draft (as it has been authorized by an authenticated Web buyer) and that payment on the draft presented to the Web buyer's home bank will be made. If, however, the Web buyer is not authenticated or if one or more of the Web buyer home bank's imposed constraints are not satisfied, the iDraft™ transaction presented to the Web buyer's home bank fails. A failure notification (which may itself be encrypted) may be generated to all relevant parties to confirm the failure of the transaction. iDraft™ fees may be assessed by either of the Web buyer's home bank or the Web Seller's bank, notwithstanding the failure of the underlying transaction. iDraft™ fees may also be assessed by either or both of the banks associated in a successful transaction.

The Web buyer is authenticated by his or her home bank for one session only: the Web buyer will need to be authenticated again the next time he or she logs on to the Web seller's Web site. However, the Web buyer need not necessarily re-enter the identification of his or her home bank the next time he or she purchases an item from that Web Seller. Indeed, the Web seller may store the Web buyer's ID and the identification of the Web buyer's home bank in a master file maintained locally, such as within the Web seller's server. In this manner, the next time the Web buyer visits the Web seller's Web site, the Web seller will know which bank is the Web buyer's home bank and may contact that bank automatically for authentication of a further iDraft™ transaction for the Web buyer's next purchase, assuming the Web buyer has not changed his or her home bank.

The security of the Web buyer's personal and/or financial information, as well as the security of the transaction between the Web buyer and Web seller itself, is assured at several levels. Indeed, all communications involving the transfer of identification information and data, such as biometric data and/or IDs, passwords and the like, are preferably carried out over secure communications channels and encrypted. Moreover, the encryption scheme used to encrypt the Web buyer's password at the Web buyer's home bank is known only to the Web buyer's home bank's Directory software and not to the bank itself, the Web seller or the Web buyer. According to the present invention, no Web seller stores or has access to more (unencrypted) information from the Web buyer than the Web buyer's ID and an identification of the Web buyer's home bank, unless the Web buyer voluntarily offers such to the Web seller. This is in contradistinction to the current prevailing practice of routine collection of names, addresses, telephone numbers and credit card information. This sensitive information, according to the present invention, is maintained by the entity that already has access thereto and control there over: the Web buyer's home bank. Dissemination of the Web buyer's personal and financial information is, therefore, limited to an entirely benign Web buyer ID and identification of the Web buyer's home bank. In addition, once the Web buyer has been authenticated by the home bank and the home bank has authorized payment of the draft (has honored the draft or has agreed to honor the draft), the Web seller is assured that he or she will, in fact, be paid for the amount of the Web buyer's on-line purchase(s). This assurance may take the form of an email sent to the Web seller by the Web buyer's home bank through the VPN established between the iDraft™ software at the Web seller's site and the iDraft™ software at the buyer's home bank, the email stating that the Web seller will be paid, subject to any previously agreed upon terms and conditions. The financial institution, such as the Web buyer's home bank, therefore, assumes a greater role in e-commerce as the only holder and controller of the Web buyer's financial information and as the guarantor of the security and integrity of e-commerce transactions between the Web buyer and the Web sellers whose banks belong to the iDraft™ Association or other similar standard setting and overseeing organization that ensures compliance with previously agreed upon common rules for implementation of the present invention.

The transactions between the interested parties, such as the Web buyer, the Web seller and the home bank are carried out at great speed, even without the benefit of high-speed connections between the respective parties. Indeed, the amount of information exchanged during any particular exchange may be on the order of a few hundred bytes, as only a small amount of information is actually transferred between the Web buyer, the Web seller's Directory software and the home bank's Directory software. Indeed, an encrypted message containing the Web buyer's ID and password need only use about 100 bytes or less. The communications between the Web seller and the Web buyer's home bank may be similarly brief. In any event, banks are generally well suited to handle the small added communications bandwidth necessitated by the present invention, as banks typically maintain high-speed communication networks to handle existing electronic transactions. As the amount of information to be exchanged during a typical transaction according to the present invention is very small, the Internet is well suited to act as the medium over which the parties communicate. Indeed, even at dial up speeds (on the order of a few tens of kilobits per second at the time of this writing), the Web buyer can be very rapidly authenticated and receive confirmation for his or her purchase from the Web seller (and thus from the Web buyer's home bank) in a sufficiently short period of time to foster a wide acceptance of the present invention, both at the Web buyer and the Web seller's level.

Figure 3:
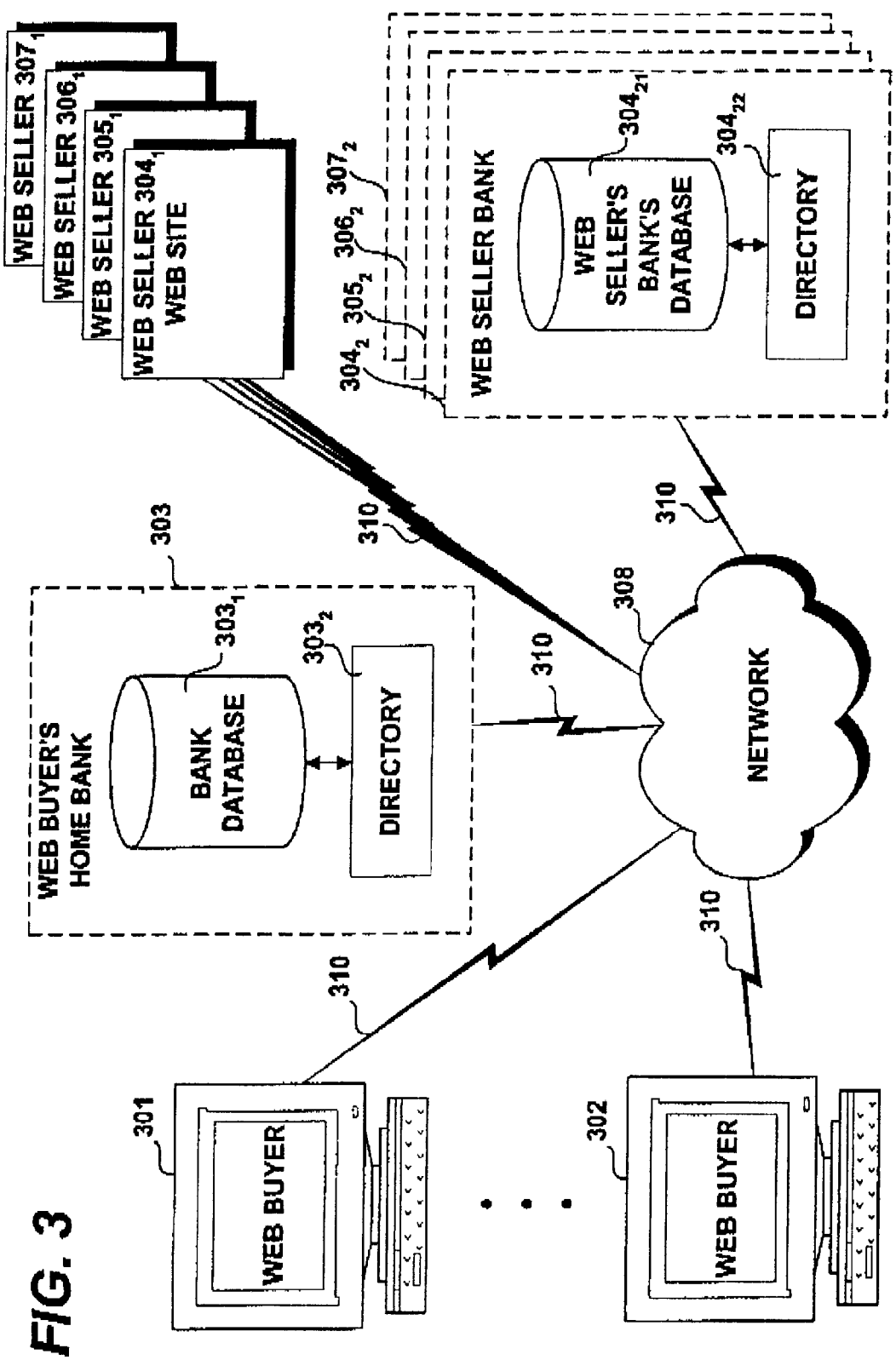
FIG. 3 shows a system or a network of computing devices adapted to carry out embodiments of the present invention, each of the computing devices being coupled to a network (such as the Internet, for example).

FIG. 3 shows a system of computing devices $301$, $302$, $303$, $304_2$, $305_2$, $306_2$, and $307_2$ adapted to carry out embodiments of the present invention, each of the computing devices $301$, $302$, $303$, $304_2$, $305_2$, $306_2$ and $307_2$ being coupled to a network $308$. Each of the computing devices $301$, $302$, $303$, $304_2$, $305_2$, $306_2$ and $307_2$ may have a structure similar to that outlined in FIG. 8, for example. The Web buyers, according to the present invention, may utilize personal computers, workstations, Web-based appliances or any other means of accessing the network $308$ through one or more of a variety of network access channels $310$. Such means are generically shown at reference numerals $301$ and $302$. Network access channels $310$ may include telephone lines, leased lines, wireless channels and the like. The network $308$ may include any type of network, whether public, private or a hybrid of public and private networks. For example, the network $308$ may include the Internet. The Web buyer's home bank's server, shown at reference $303$, is also connected to the network $308$ and includes a database $303$, managed by Directory software $303_2$. Each of the Web sellers participating in the iDraft™ system according to the present invention maintains a Web site $307_1$, $306_1$, $305_1$, and $304_1$, that is accessible to the Web buyers $301$, $302$ through the network $308$. Each of the Web sellers, in turn, is coupled to its respective home bank $307_2$, $306_2$, $305_2$ and $304_2$, again, via the network $308$. Each of the Web sellers' home banks $307_2$, $306_2$, $305_2$ and $304_2$ maintains a database containing the Web Seller's ID, encrypted password, financial information and the like, which database is controlled by Directory software. For simplicity of illustration, only the database $304_{21}$, and the Directory software $304_{22}$ of the Web seller $304$, is shown in FIG. 3. In the case wherein Web buyer $301$ and a Web seller $304_1$, for example, share the same home bank $304_2$, the Web buyer's home bank $303$ may be omitted, all transactions occurring within the bank $304_2$. That is, the Directory software at Web seller $304_1$ causes an LDAP-formatted (for example) query to be sent to the Web seller's (and Web buyer's) home bank $304_2$, which query contains the ID of the Web buyer $101$ and an identification of the Web buyer $301$'s home bank (in this case, the Web seller's home bank $304_2$), as inputted by Web buyer $301$. The bank $304_2$ may then request the password of the Web buyer $301$, encrypt it and consult its database $304_{21}$ to match the Web buyer $301$'s ID and encrypted password with the stored and encrypted password corresponding to that ID. If a match is found, the Web buyer $301$ is authenticated for this transaction only. The Web seller $304_1$ and the Web buyer $301$'s home bank $304_2$ may, thereafter, check the Web buyer $301$'s accounts to determine whether Web buyer $301$ has sufficient funds on deposit to cover the amount of purchase of the iDraft™ transaction and any iDraft™ transaction fees associated therewith. If so, the electronic draft presented by the Web Seller $304_1$ to the Web seller's home bank $304_2$ for the Web buyer $301$'s purchases will be honored by the parties' common home bank $304_2$. That is, a notification may be dispatched to the Web seller $304_1$ and/or to the Web buyer $301$, the notification indicating that the bank $304_2$ will in fact honor the draft. The Web seller $304_1$, thereafter may release the goods or perform the services in question with complete assurance that it will be paid therefor.

However, often the Web seller $304_1$ and the Web buyer $301$ do not share the same home bank. The Web buyer's home bank $303$ and the Web seller's home bank $304_2$ are now assumed to be separate entities. Upon visiting the Web seller's Web site $304_1$, the Web buyer $301$ will cause the Web seller $304_1$ to execute an iDraft™ transaction as payment for the goods and/or services selected. According to an embodiment of the present invention, the Web seller's Web site $304_1$ will then request authentication of the Web buyer $301$ by requesting the Web buyer's ID and the identification of the Web buyer $301$'s home bank $303$. The Web seller $304_1$'s Directory software, administered and controlled by its home bank $304_2$ will then forward the supplied information to the home bank identified by the Web buyer $301$. Alternatively, the information supplied by the Web buyer $301$ (ID and identification of home bank $303$) may be transmitted to the Web seller $304_1$'s home bank $304_2$, which bank $304_2$ forwards the supplied information to the Web buyer $301$'s home bank $303$ for authentication. In any event, the Web buyer $301$'s home bank $303$ then requests the Web buyer $301$'s password over a secure communication channel. The Web buyer $301$'s home bank $303$ then encrypts the provided password and consults its database $303_1$ to match the Web buyer $301$'s ID and encrypted password with the stored and encrypted password for that ID. If a match is found, the Web buyer $301$ is authenticated for this transaction only. The Web buyer $301$'s home bank $304_2$ may thereafter check the Web buyer $301$'s accounts to determine whether Web buyer $301$ has sufficient funds on deposit or available credit to cover the amount of purchase and any iDraft™ transaction fees associated therewith. If so, the electronic draft presented by the Web Seller $304_1$ to the Web buyer $301$'s home bank $303$ for the Web buyer $301$'s purchases will be honored by the Web buyer $301$'s home bank $303$. Payment on the draft may be immediate and/or a notification may be dispatched to the Web seller $304$, and/or to the Web buyer $301$, the notification indicating that the Web buyer $301$'s home bank $303$ will in fact honor the draft. The Web seller $304_1$, thereafter may release the goods or perform the services in question with complete assurance that it will be paid therefor.

Many transactions, however, are not structured around a single buyer buying goods or services from a single seller in a single, isolated and independent transaction. Complex transactions often include staged performances and staged payments, payments contingent upon some action on the part of the buyer and/or seller or time restrictions on acceptance and performance. Such transactions may not be easily fitted into the simple transactional model detailed with reference to FIGS. 1a, 1b, 2 and 3. Such transactions, to be carried out securely over a public network such as the Internet, require an e-commerce infrastructure able to support such added complexities as contingencies (whether involving payments or not), staged performances and part payments. The present invention supports such complex transactions by employing an infrastructure that may be termed an iTransaction (hereafter "iTX"). An iTX, according to an embodiment of the present invention, may include a number of iDraft™ transactions as described above and/or one or more contingent iDraft™ transactions (hereafter "iDraft-C™"), described herein below. The constituent iDraft™ and/or iDraft-C™ transactions of an iTX according to the present invention may be interdependent or may be wholly independent of one another. The iTX includes a framework that insures that each of its constituent iDraft™ and/or iDraft-C™ transactions succeeds and reports success or failure of the iTX to all parties to the iTX. A successful iDraft™ transaction, according to an embodiment of the present invention, may be defined as an electronic draft negotiated between two or more authenticated parties on which payment has been made. An iDraft-C™ transaction, according to an embodiment of the present invention, may be defined as an iDraft™ transaction, the release of payment on which is predicated upon the removal (or, synonymously, satisfaction) of one or more associated contingencies. Removing a contingency, according to exemplary embodiments of the present invention, may include carrying out (or promising to carry out) some necessary action, the successful completion of one or more iDraft™ transactions or waiving some action or obligation, for example. Therefore, a successful iDraft-C™ transaction, according to an embodiment of the present invention, may be defined as an iDraft™ transaction in which all associated contingencies have been satisfied (removed) and in which all constituent iDraft™ transactions have been honored (e.g., paid).

Figure 4:
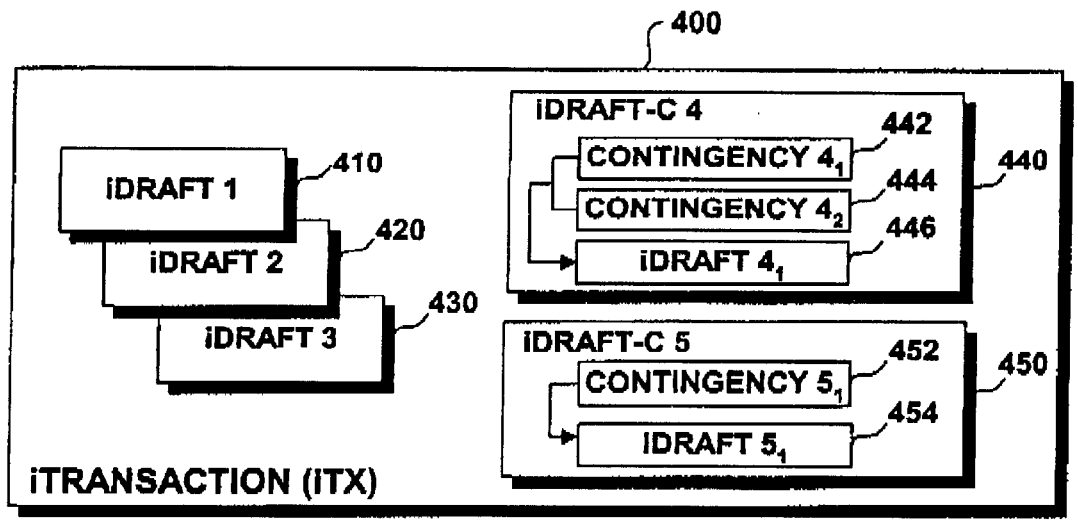
FIG. 4 is a block diagram of the logical structure of an exemplary iTransaction (iTX)

The logical structure of the iTX, an example of which is shown in FIG. 4, may mirror the architecture of the underlying transaction to be carried out. That is, the iTX may list each of a series of related payments (each to be made using an iDraft™ transaction, for example) and/or one or more contingent payments (each made using an iDraft-C™ transaction upon removing one or more associated contingencies). The series of iDraft™ and/or iDraft-C™ transactions may be carried out remotely over a network such as the Internet, using the authentication procedures detailed above relative to iDraft™ transactions. Such transactions, therefore, may be carried securely and remotely from common secure Web browser software (or any other appropriate and secure communications software) from any Web-capable device having the capability of accepting and transmitting users' identification (biometric data and/or ID and password pairs, for example) over the network to another computer. In this manner, transactional security is assured without resorting to physical or digital holographic signatures and without resorting to a near indiscriminate dissemination of sensitive personal information (such as credit card numbers, for example) over public networks to a myriad of Web sellers.

As shown in FIG. 4, an iTX 400 according to an embodiment of the present invention, may include a number of iDraft™ transactions, such as shown at references 410, 420 and 430. Each of these iDraft™ transactions may correspond, for example, to a payment that a specified first party (a buyer, for example) must make to a specified second party (such as a seller, for example). Alternatively, each iDraft™ transaction may involve multiple parties at each end of the transaction. Each of the iDraft™ transactions 410, 420 and 430 may involve the same, some of the same or wholly different parties. Each of these parties to the iTX (and by extension, each of the parties to the constituent iDraft™ and iDraft-C™ transactions), however, must be authenticated in the manner detailed with respect to FIGS. 1a, 1b, 2 and 3 for payment(s) on the drafts to be released. In turn, authentication entails that each party to the iTX 400 belong to a participating iDraft™ institution, such as his or her home bank. In the example illustrated in FIG. 4, iDraft™ transaction 1, referenced by numeral 410, may represent a draft for the down payment on a property, which down payment must be paid for the iTX 400 (representing a complete residential real estate transaction, for example) to succeed. iDraft™ transactions 2 and 3 (reference numerals 420 and 430, respectively) may represent drafts for payment of other taxes or services which each must be paid for the entire residential real estate transaction represented by the iTX transaction 400 to succeed, i.e., for the sale to be consummated.

The iTX transaction 400, as shown in FIG. 4, may also include one or more contingent payment iDraft™ transactions, referenced by iDraft-C™ 4 440 and iDraft-C™ 5 450. Each of the iDraft-C™ transactions 440, 450 may include one or more contingencies that must be satisfied (i.e., removed) for payments to be made on the underlying respective iDraft™ transactions. In the illustrative example of FIG. 4, the iDraft-C™ 4 440 transaction includes two contingencies; namely contingency $4_1$ 442 and contingency $4_2$ 444, whereas the iDraft-C5™ 450 transaction includes a single contingency $5_1$ 452, which must be satisfied for payment on iDraft™ $5_1$ 454 to occur. In keeping with the real estate transaction example, contingency $4_1$ may be related to a structural inspection of the home, whereas contingency $4_2$ may be related to an inspection of the electrical system thereof, for example. According to the structure of the iDraft-C™ transaction 440, both the structure and electrical system of the home must pass inspection for payment to be made on the iDraft $4_1$ 446 to, for example, the general contractor. Thus, according to this example, both the structural and electrical inspectors would be designated as parties or contingency removers to the iTX 400 (and specifically to the iDraft-C™ 4 440) and would each need to be authenticated in the manner described above. Assuming the structure and electrical systems pass inspection, the structural and electrical systems inspectors would log onto, for example, the Web site administered by the escrow agent or other trusted party (such as the buyer's or seller's bank, for example), become authenticated by their respective home banks in the manner described above and be presented with the option to remove the appropriate contingency or contingencies by checking an appropriate box with the click of a mouse or other input device, for example. In a similar manner, the contingency $5_1$ may represent the completion and inspection of a swimming pool and the iDraft $5_1$ transaction may represent payment to the pool contractor.

Should the structural inspection reveal serious defects, for example, the sale of the residential real estate would not be consummated and the buyer and seller would not exchange payment for the underlying property. iTX transactions according to the present invention support such real-world constraints by tying the success of the deal (the sale of the residential real estate in the current example) to the payment of each of the constituent iDraft™ and iDraft-C™ transactions, and to the satisfaction (e.g., removal) of each listed contingency, whether or not associated with an iDraft™ transaction. In the case wherein the structural inspection fails, the contingency remover (in this case the structural inspector) would not exercise the option to remove the structural inspection contingency and the iTX representing the overall residential real estate transaction would fail. In the case of iTX 400, each of the iDraft™ transactions 410, 420 and 430 and each of the iDraft-C™ transactions 440 and 450 must be successful (all listed contingencies removed and payment(s) made) for the iTX 400 itself to be successful.

Figure 5:
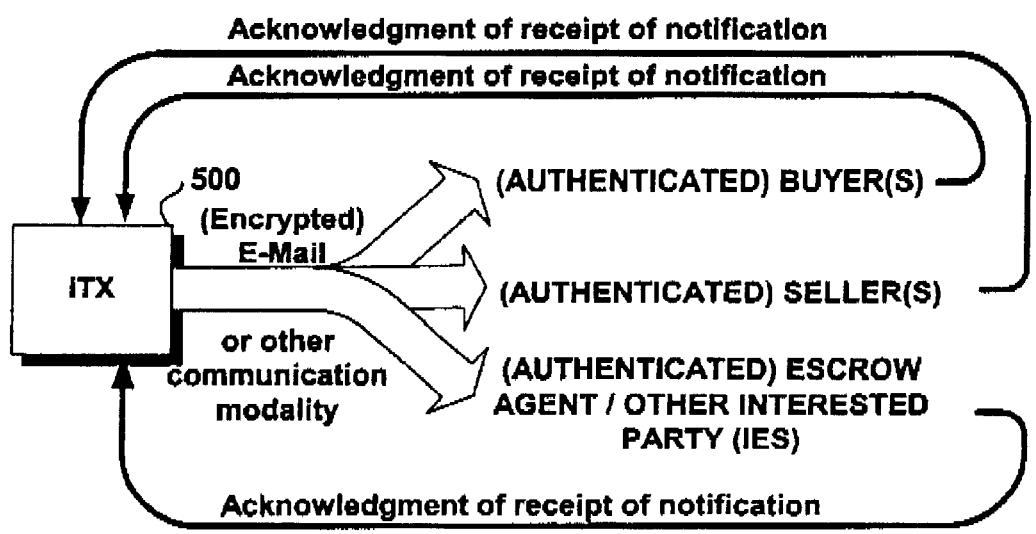
FIG. 5 is an illustration of an iTX sending notifications to all interested parties to the iTX.

When a party to a transaction causes an iTX transaction to be created, such as shown at reference 500 in FIG. 5, the iDraft™ software according to the present invention causes each party (and/or each contingency remover, as appropriate) to the transaction to be notified of his or her requested participation in the iTX. According to an embodiment of the present invention, such notification may be carried out via email, for example. The parties to the iTX transaction 500 may be notified of their requested participation via modalities other than email, and all such other notification modalities are to be included within the scope of the present invention. As shown in FIG. 5, the iTX 500 notifies (sends an email requesting the participation of) at least the buyer or buyers of the property or properties (or service or services) involved in the underlying iTX transaction 500, the seller or sellers of the underlying property or properties, a trusted party such as an escrow agent(s) and/or any other interested (e.g., necessary) party or parties to the transaction. The notifications may be encrypted, especially when the bank administering the iTX transaction 500 functions as an Internet Service Provider (ISP). The trusted party may be a financial institution (such as the buyer's home bank, for example), a corporate entity with fiduciary characteristics and established accounts (such as the seller's real estate agency, for example) or some other public or governmental institution (such as the post office, for example). An example of an interested party is that of a contingency approver. In the example of the residential real estate transaction, a contingency approver may be the structural inspector who, although neither a buyer nor a seller of the involved property underlying the transaction, is nevertheless a necessary party thereto.

Upon being notified of their requested participation in the iTX transaction 500, each notified party (including contingency approver) preferably must take steps to be authenticated by the iDraft™ system. Authentication may be valid only for a session of a limited duration. To become authenticated, each notified party may initially carry out steps S11a, S12a and S13a shown in FIG. 1a, wherein the phrase "notified party" may be substituted for the phrase "Web buyer" and the selected trusted party may be substituted for the phrase "home bank or branch". If the notified party already has iDraft™ privileges (has previously carried out steps S11A–S14A of FIG. 1A) then he or she need not repeat these steps again and may become authenticated remotely as detailed above via a Web browser, for example. According to the present invention, the trusted party (most often the party's home bank) determines the levels of documented identification necessary to support authentication of the notified party to the iTX transaction 500. The visit to the trusted party may be carried out physically (in person) or may be carried out by visiting the trusted party's Web site and providing evidence of identity, to the satisfaction of the trusted party. Each of the notified parties to the iTX transaction 500, therefore, may receive a unique ID and may select or be assigned a password, in the manner described above. Alternatively, biometric data or bank-controlled certificates may supplant or supplement the ID-password combination. Indeed, additional advanced security measure (such as the use of certificates, for example) may be required in the buyer-seller-bank relationship when, for example, large sums of money are transferred via iDraft™ or iDraft-C™ transactions or any other instance wherein the bank requires added measures of security. Such certificates may then be one-time, transaction-specific certificates authorizing the transaction or may be multiple time certificates applied in special circumstances to determine the limits of the transactions. External certificates may unduly burden the free flow of normal e-commerce and their use, preferably, should be relegated to special circumstances. The external certificate (and/or other security measures agreed upon between the iDraft™ bank—or other trusted party as defined above—and the customer), when used, should be provided by the iDraft™ bank to the customer and must be implemented in addition to the authentication of the customer according to the present invention, and not as a substitution therefor.

According to an embodiment of the present invention, should any of the constituent iDraft™ or iDraft-C™ transactions of the iTX transaction 500 (such as the iDraft™ transactions 410, 420, 430 or any of the iDraft-C™ transactions 440, 450 of FIG. 5) fail, the iTX 500 itself fails with notice to all parties to the transaction. The iDraft™ transactions representing bank fees, technology owner fees, iDraft™ Association fees and other transactional fees may succeed, even through the underlying iTX500 may have failed. Referring back to FIG. 4, such a failure may be caused by non-payment on any of the constituent iDraft™ 410, 420, 430 or iDraft-C™ 440, 450 transactions of the iTX 400 or, for example, by an authenticated party or contingency approver rejecting (failing or refusing to exercise the provided option to remove) any of the (time-based, for example) contingencies of the constituent iDraft-C™ transactions. The failure notice notifies all parties that the iTX transaction (and thus the underlying deal) has failed. Partial payments, released in response to the presentation of one or more constituent iDraft™ 410, 420, 430 or iDraft-C™ 440, 450 transactions may then be retained or fully or partially refunded, as appropriate under the circumstances or as previously agreed between the parties to the transaction and the trusted party. The trusted party may retain a portion of the payments released in lieu of transactional fees. Moreover, some parties may still be paid via an iDraft™ transaction (such as property inspectors, for example), even though the iTX has failed.

The bank or other appropriate fiduciary institution may establish appropriate constraints based upon the buyer's agreement with the bank (such as the terms of the loan extended to the buyer) and/or the buyer's retrieved financial information (availability of funds and/or credit limit, for example). Thus, a trusted party such as a bank may limit the magnitude of any payment to be made on an iDraft™ (an otherwise unconditional payment or promise to pay) or iDraft-C™ transaction.

Figure 6:
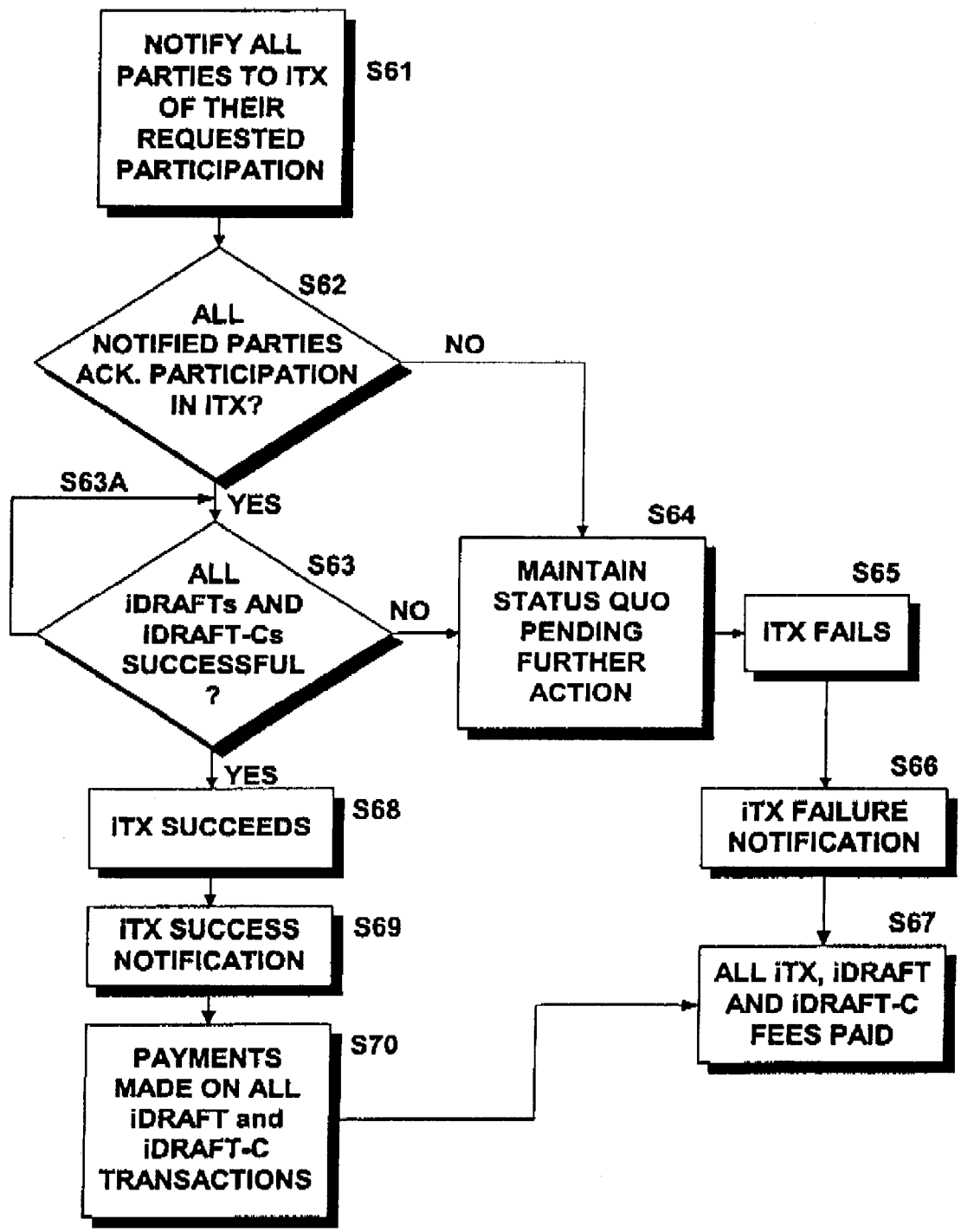
FIG. 6 shows a flowchart of the execution flow of an iTX transaction, according to an embodiment of the present invention.

FIG. 6 shows a flowchart of the execution flow of an iTX transaction, according to an embodiment of the present invention. As shown therein, step S61 notifies all parties to the iTX transaction of their requested participation therein. According to an embodiment of the present invention, the notification may be carried out by secure (i.e., encrypted) email over a VPN on the Internet. The parties to an iTX transaction may include, for example, the buyer(s)/seller(s), the payor(s)/payee(s), the contingency approver(s), the trusted party (e.g., bank(s) and/or other escrow agent(s)). According to an embodiment of the present invention, each party to an iTX transaction may remotely (using a Web browser, for example) inspect (i.e., view) all of the constituent iTX transaction or the selected portion or portions thereof that concerns them (depending upon the permission levels granted to each party upon the creation of the iTX transaction and/or during the authentication procedure) and monitor the progress of the overall iTX transaction by determining which iDraft(s)™ and/or iDraft-C™ transactions are still pending, if any. A pending iDraft™ or iDraft-C™ transaction, according to the present invention, may be thought of as a transaction on which payment has not been released by the drawee of the underlying draft. To inspect an iTX transaction, one must be a party thereto or a contingency approver thereof (e.g., have received a notification requesting participation therein), and have become authenticated in the manner detailed relative to FIG. 1b, for example. The iTX transaction is then presented by the bank's software (in the case wherein the iTX transaction is maintained or hosted by the bank) and authenticated parties may, depending upon the level of privilege granted to them during the authentication procedure, approve and/or disapprove any of the contingencies of any of the iDraft-C™ transactions appropriate to that party, or take no action at all. It is to be noted that an authenticated party may be authenticated only for a limited purpose, such as approving or disapproving a specific contingency, for example. In the example above, the structural inspector may be authenticated only for the limited purpose of approving/disapproving the contingency related to the structural inspection of the home and not for any other purpose. Such a limited authentication may also limit the extent of the textual or graphical representation of the iTX transaction that is visible to the authenticated party or contingency approver as he or she logs onto the Web site hosting the iTX transaction.

Returning now to FIG. 6, step S62 determines whether all notified parties to the iTX transaction have acknowledged receipt of the notification (shown in FIG. 5), have become authenticated and have indicated their willingness to participate in the iTX transaction and the underlying deal. Upon failure of the iTX transaction, as would occur if fewer than all notified participants acknowledge receipt of the notification (NO branch of S62 or when all iDraft™ transactions and iDraft-C™ transactions were not successful, as indicated by the NO branch of S63), the underlying transaction may be frozen in its current state pending further action, as shown in step S64. In such as case, none of the iDraft™ or iDraft-C™ transactions may be carried out and none of the options to remove any of the contingencies (if the involved iTX includes such) may be exercised. Upon failure of the iTX, as shown in step S65, a failure notification is sent to all previously notified parties, as shown in step S66. As shown in step S67, the iTX, iDraft™ and/or iDraft-C™ transaction fees, if any, may nevertheless be paid to the participating iDraft™ banks and/or iDraft™ Association, notwithstanding the failure of the involved iTX transaction. If, however, all notified parties to the iTX transaction acknowledge receipt of their respective notification in step S62, become authenticated and indicate their willingness to participate in the iTX transaction, the method according to the present invention proceeds to step S63. In step S63, it is determined whether all of the constituent iDraft™ and/or iDraft-C transactions of the iTX transaction have succeeded; i.e., whether all required payments have been released on all constituent iDraft™ and iDraft-C™ transactions within the designated time limit for completion of the iTX (if such time limit exists) and whether all contingencies that do not involve a payment (if any) have been released. The method according to the present invention may remain at step S63 until the expiration of such time limit, as shown by arrow S63A. Payment on each iDraft-C™ transaction entails that each contingency of each such iDraft-C™ transaction has been released or satisfied. If it is determined in step S63 that all constituent iDraft™ and iDraft-C™ transactions of the iTX transaction have indeed been successful, then the iTX transaction itself is deemed a success, which entails that the underlying physical deal or transaction on which the iTX transaction is modeled was itself successfully consummated or carried out to completion (or that all antecedent steps necessary for successful completion of the transaction have been carried out). Upon success of the iTX transaction in step S68, each party to the transaction is so notified, as noted in step S69 and all payments on all iDraft™, iDraft-C™ and iTX transactions are released, as shown in step S70. Payments may then also be made for all appropriate iTX, iDraft™ and iDraft-C™ fees, as shown in step S67. Such fees may take the form of an iDraft™ transaction between the bank as both drawer and drawee.

Figure 7:
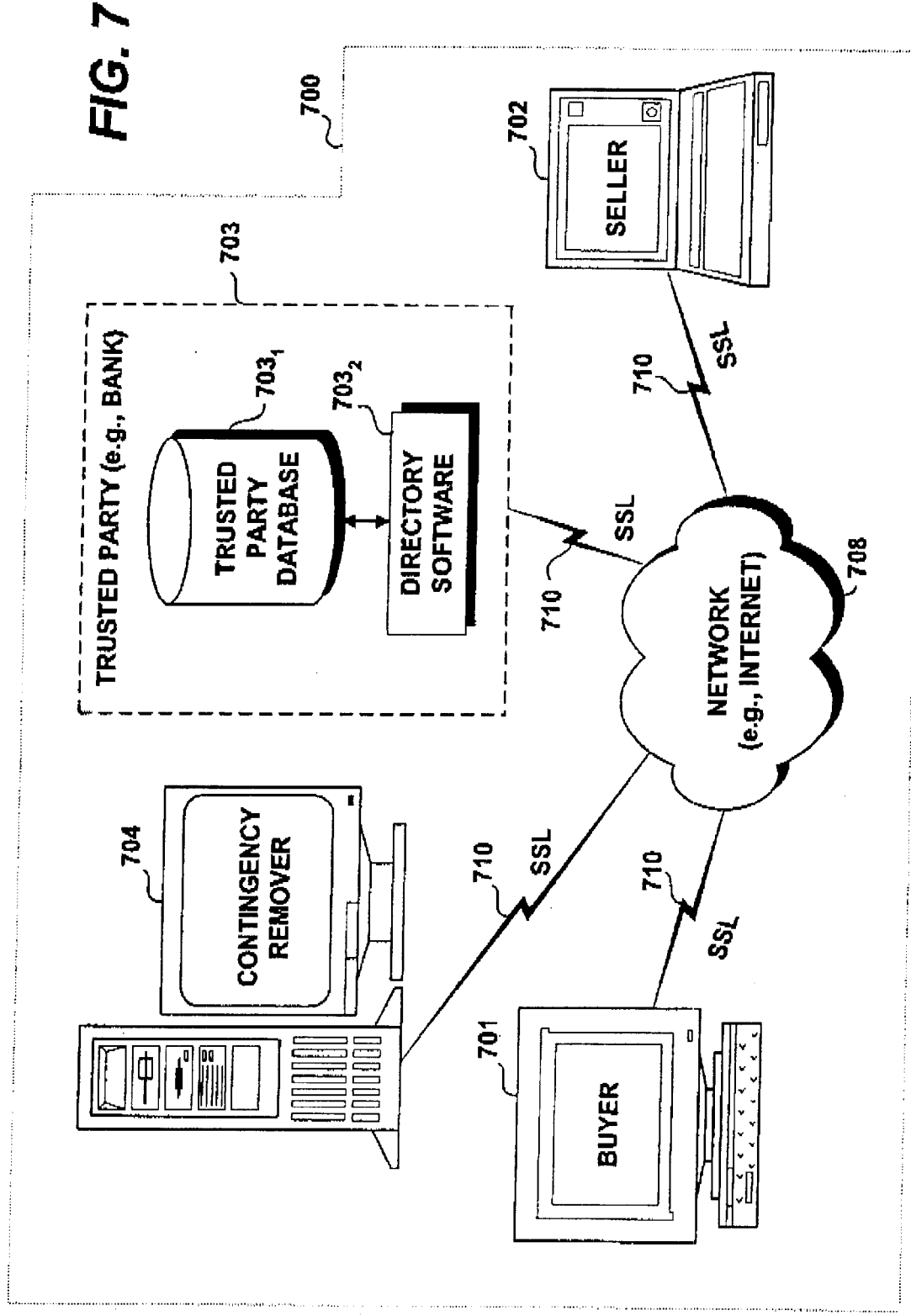
FIG. 7 shows a system or a network of computing devices adapted to carry out an iTX transaction according to an embodiment of the present invention, each of the computing devices or network-enabled devices being coupled to a network, such as the Internet.

FIG. 7 shows a system or a network of computing devices 700 adapted to carry out an iTX transaction according to an embodiment of the present invention, each of the computing devices or network-enabled devices being coupled to a network 708. FIG. 7 shows an example wherein an iTX transaction has been initiated and launched by a trusted party 703 such as a bank, a corporation with fiduciary duties, governmental agency or other trusted or neutral party to the transaction. As shown in the exemplary representation of FIG. 7, the parties to the involved iTX transaction may include a buyer 701, a seller 702 and a contingency remover 704, each symbolically represented by computed devices. Each of the computing devices 701–704 may have a structure similar to that outlined in FIG. 8, for example. The buyer 701, the seller 702, the trusted party 703 and/or the contingency remover 704, according to an embodiment of the present invention, may utilize personal computers, workstations, Web-based appliances or any other means of accessing the network 708 through one or more of a variety of network access channels 710. Such network access means are generically shown in FIG. 7 at reference numerals 701, 702, 703 and 704. Network access channels 710 may include telephone lines, leased lines, wireless channels and the like. The trusted party's computer (e.g., server), shown at reference 703, is also connected to the network 708 and may include a database 703, and/or Directory software 7032. The network 708 may include any type of network, whether public, private or a hybrid of public and private networks. For example, the network 308 may include the Internet. The trusted party 703, according to an embodiment of the present invention, may maintain a Web site that includes a textual and/or graphical representation of the iTX transaction (such as iTX transaction 400 of FIG. 4). The URL or other identifier of such a Web site may be advantageously included, for example, in the encrypted email notification (shown in FIG. 5) sent to each of the requested participants to the involved iTX transaction. After logging onto the trusted party's Web site, each party and/or contingency remover of the iTX transaction may be authenticated in the manner discussed relative to FIGS. 1a, 1b and 2, for example, through the trusted party's Directory software $703_2$ and database $703_1$. To insure transactional security of the constituent iDraft™ and iDraft-C™ transactions of the involved iTX transaction, communications with the trusted party 703 may be carried out via the network access channels 710 according to the SSL protocol or according to some other secure communications protocol. The present invention is not, however, limited in its scope to any particular data encryption scheme or secure communication protocol, as suitable encryption schemes and communications protocols are well known to those of skill in the art.

Depending upon the permission level granted by the Directory software $703_2$, each of the parties (and contingency removers) to the iTX may view all or selected portions of the iTX transaction to exercise the option to remove (or to deny) contingencies and/or view the current status of the iTX transaction, for example. For example, both buyer 701 and seller 702 may be granted permission to view the entire iTX transaction, whereas the contingency remover 704 might be granted a permission level consistent with viewing, approving or disapproving those contingencies which he or she has been tasked with approving or disapproving. The use of Directory software in the manner detailed herein is advantageous, as it allows complex transactions to be consummated in an anonymous yet secure fashion. Indeed, access to the buyer's financial information may be restricted to the trusted party 703 (for example, the buyer's home bank, which already has access to and established measures to safeguard that information). This allows the buyer 701 to restrict the personal information divulged to the seller 702, all the while providing the seller 702 with complete assurance that drafts presented to the bank 703 through iDraft™ and/or iDraft-C™ transactions will be honored, barring bank-imposed constraints (such as lack of sufficient funds on deposit, for example). Thus, transactional security is assured and buyers and sellers and other parties to the iTX transaction may selectively limit the amount of personal information that is disseminated by choosing to interact in an anonymous, quasi-anonymous or open fashion. For example, in an anonymous mode, the parties may be identified only by their ID, for example. The bank may contract with a shipping company to arrange delivery of the goods purchased by the buyer, thus further protecting the anonymity of the buyer. In this manner, the buyer can prevent the seller from learning his or her address. For legal and law enforcement purposes, the bank may maintain a paper trail or other durable record of each transaction. Moreover, title to the underlying property of the iTX (e.g., the deed of a track of land, to use the real estate example developed above) may be transferred by the seller 701 only upon success of the entire iTX transaction—such as upon receipt of the iTX success notification shown in step S68 in the flowchart of FIG. 6, which entails that all contingencies have been removed and all payments, whether associated with an iDraft™ or iDraft-C™ transactions have been made and credited to the proper account or accounts, in the manner detailed above.

The following implementation examples illustrate sequences of interaction between relevant parties, as an iDraft-C™ transaction is authorized by a buyer, subject to specified contingencies. In the following implementation examples, all parties to the iDraft-C™ and/or iTX™ transactions may perform appropriate, secure actions remotely (from Web browser software over the Internet, for example), in contrast to the current practice of using in-person holographic signatures. Further, the current practice of using credit card numbers (or similar sensitive and potentially abused personal information) for authentication at Web sites is made unnecessary through the use of iDraft-C™ and/or iTX™ transactions according to the present invention. iDraft-C™ and/or iTX™ transactions may be employed in a related series of interdependent contingent payments, each payment being logically triggered by the release of one or more contingencies defined by the respective parties to the transaction.

IMPLEMENTATION EXAMPLE 1

Online Auction

In the online auction example, multiple buyers bid on one or more objects or services sold by a seller through a Web site. Neither the buyers nor the sellers wish to needlessly disseminate personal information, yet each desires some assurance that the other party will perform: the auction buyer having placed the winning bid wishes to protect his or her confidential information, wishes to assure him or herself that the item in question is as described by the seller and be assured that the seller will, in fact, deliver the purchased item in a timely manner. The seller, in turn, requires some assurance that the bid amount will be properly credited to seller's account before parting with the involved item. Both parties may wish to protect and restrict the dissemination of their respective personal information without, however, resorting to such identification-surrogates as credit card and/or social security numbers. The present inventions satisfy these requirements by providing an infrastructure including iDraft™ and/or iDraft-C™ transactions through an iTX transaction, such as shown at reference 400 in FIG. 4. To do this, according to the present invention, the auction buyer (hereafter, "buyer") may log onto the auction Web site and become authenticated by supplying an identification of his or her home bank and a personal ID through an SSL, via appropriate browser software. The Directory software at the auction site (provided, maintained and controlled by the auction site's home iDraft bank in this example) may then request authentication of the buyer from the buyer's home bank, whose own Directory software will request the auction buyer's password, encrypt the password provided and compare the ID and encrypted password provided by the auction buyer with the matching stored encrypted password for that ID. If the encrypted password and ID pair stored at the auction buyer's home bank matches the ID and password pair provided by the buyer (the password being encrypted by the buyer's home bank), the buyer is authenticated for this session only. To maintain security, the auction Web site's bank may also host the auction site's Web domain at the buyer's home bank's server, for example, a fact that would be transparent to the buyer.

Once authenticated, the buyer selects an item to purchase from seller and, for exemplary purposes only, is assumed to have placed the winning bid. The buyer wishes to make sure the item is as represented by seller (e.g., nature, quantity, condition). The seller, on the other hand, wishes to make sure that buyer pays as agreed. According to the present invention, the buyer causes an iDraft-C™ to be sent an escrow agent (which may be a neutral party, the auction company or the buyer's home bank, for example) via the auction site software. The escrow agent may then remove the first contingency (buyer payment) after checking with the buyer's home bank and securing (e.g., placing in escrow, for example) the funds needed to pay the iDraft-C™ associated with the item to be purchased. The seller may then send the item in question to the buyer (or may send the item to buyer through the escrow agent), subject to a second contingency (expiration of offer date by which buyer must remove the third contingency (buyer examination)). Assuming now that the buyer examines the item within the time period specified by the second contingency and finds the item satisfactory, the buyer may log onto the auction Web site's iDraft™ page, become authenticated through his or her home bank in the manner described above and may select the option to remove third contingency of the iDraft-C™ transaction in question. The escrow agent may then be automatically notified (via encrypted email, for example) and may then exercise the option to remove the second contingency. The first, second and third contingencies of the iDraft-C™ transaction now having been removed, the buyer's home bank may automatically credit the iDraft-C™ payment(s) to the specified seller's account and to the specified escrow agent's account for the escrow agent's fees, if any. This may be done using the buyer's instructions as to whether this is a debit or credit transaction. It should be noted herein that the present invention is universally applicable, irrespective of the exact payment instrument utilized to effectuate the payment. Indeed, credit cards payments, wire transfers or any other payment instrument may be implemented within the infrastructure of the present invention.

The denial of a contingency, such as upon the expiration of the offer date, the failure of an iDraft-C™ transaction payment to be funded by, e.g., the buyer's home bank (either because of over-limit spending or insufficient funds available) or a determination by the buyer that the item is not as represented by seller causes the iDraft-C™ transaction to fail. In that case, the fees owing may be automatically collected from the buyer (and/or the Seller if the seller has agreed to post fees), and the buyer's home bank may send an iDraft-C™ transaction to the buyer (a refund of the amount placed into escrow, less expenses) contingent on escrow agent's receipt of the inspected item and the non-expiration of a new transaction date.

IMPLEMENTATION EXAMPLE 2

Real Estate Transaction

A real estate sale may be handled through a trusted party such as an escrow agent that 20 is a member of the iDraft™ system. The escrow agent's bank (the escrow agent and the bank may be one and the same) may enroll selected employees (agents) of the escrow agency, with appropriate privileges assigned through the trusted party's (e.g., bank's) Directory software at the time IDs and passwords are created. The escrow agent may create an iDraft-C™ transaction from his or her account as a contingent payment to the real estate seller, including all necessary contingencies in the instrument and assuming that the final payment is to be received by the seller after all other funds are distributed and all other contingencies are removed. The escrow agent may create an iTX™ transaction that includes the iDraft-C™ transaction above and iDraft transactions to other parties to pay off loans, pay fees or encumbrances on the real estate, pay real estate sales commissions, and the like. The iDraft-C™ transaction may allow removal of payment contingencies where some payments are made by check, by debt forgiveness or by spousal quitclaim, for example. Payments made on iDraft-C™ transactions may automatically remove the corresponding contingencies of the iDraft-C™ transaction once the bank of the intended payee receives payment.

Inspections by the buyer are an ordinarily part of any real estate transaction and the buyer (or designated contingency remover) may remotely remove such contingencies via his or her browser software, for example, by accessing the pending iDraft-C™ transaction at the escrow agent's site and by exercising an option to remove a contingency by checking, for example, a "remove contingency" box presented by the iDraft™ system software.

According to an embodiment of the present invention, all contingency-related actions may be performed at the home iDraft™ bank of the owner of the option, where iDraft™ contingency-related messages are stored in the same manner as pending iDraft™ transactions. The contingency-related messages may be sorted apart from pending iDraft™ transactions. Moreover, the contingency-related messages may themselves be pending iDraft™ transactions awaiting approval of the iDraft™ account holder. If the owner of the option is not currently an account holder at an iDraft™ bank with iDraft™ privileges, the owner must become an account holder at such a bank and request iDraft™ privileges in order to participate in such an iTX™, iDraft™-C or iDraft™ transaction.

Funds received by the escrow agent for down payments may be implemented as iDraft™ transaction payments from the buyer, subject to (at least partial) repayment if the overall real estate transaction (and thus the iTX™ transaction modeled thereon) fails for any reason. Such an iTX™ transaction likely contains both unconditional payments (iDraft™ transactions) and contingent payment (iDraft-C™ transactions) and may succeed only if all constituent iDraft™ and iDraft-C™ transactions succeed and are paid. Otherwise, the escrow agent may return all funds in accordance with the iDraft-C™ transaction agreement, by sending unconditional payments (iDraft™ transactions) to the appropriate parties, minus any appropriate transactional fees, for example.

HARDWARE OVERVIEW

Figure 8:
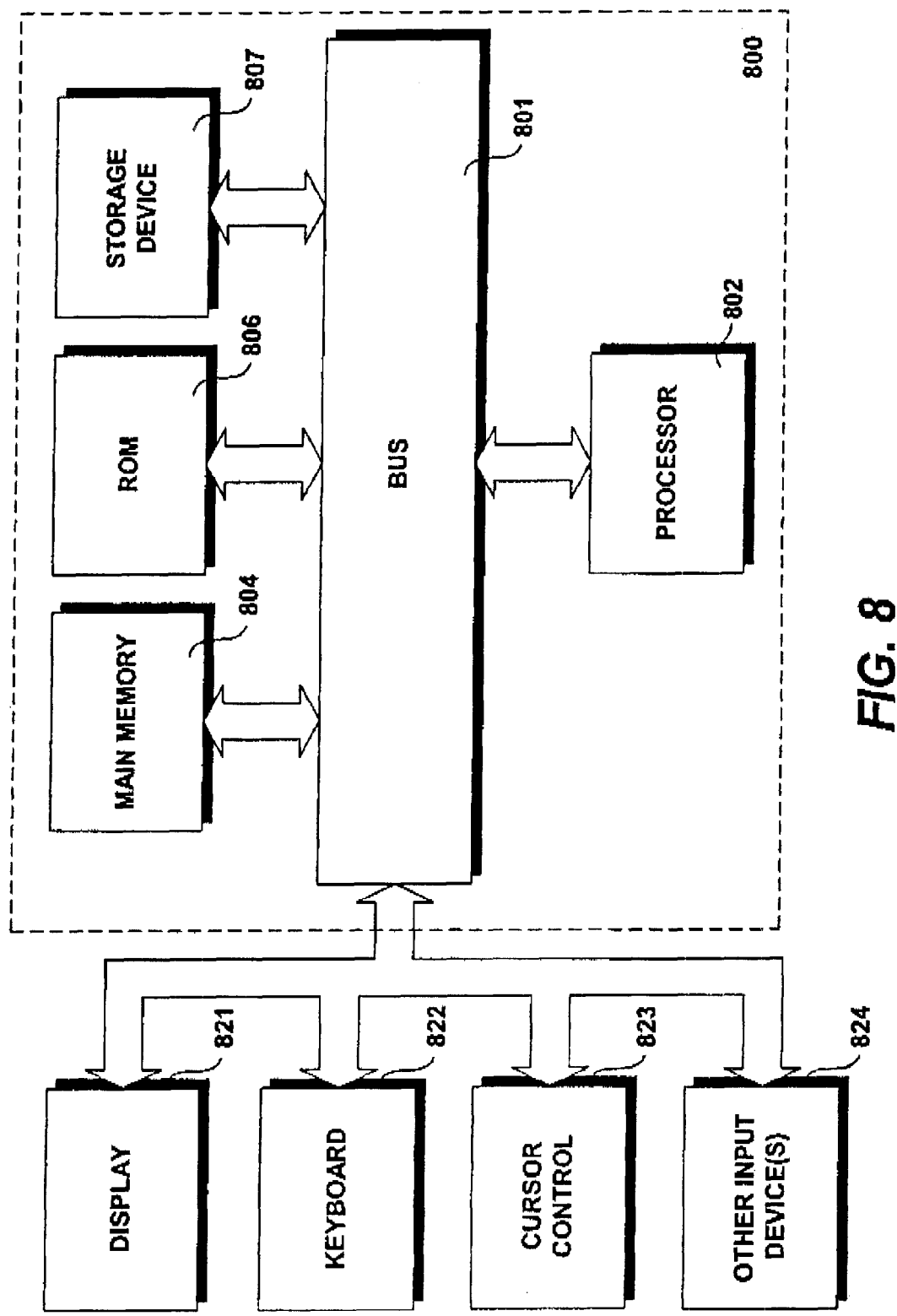
FIG. 8 illustrates a block diagram of a computer with which an embodiment of the present invention may be implemented.

FIG. 8 illustrates a block diagram of a computer 800 with which an embodiment of the present invention may be implemented. Computer system 800 includes a bus 801 or other communication mechanism for communicating information, and a processor 802 coupled with bus 801 for processing information. Computer system 800 further comprises a random access memory (RAM) or other dynamic storage device 804 (referred to as main memory), coupled to bus 801 for storing information and instructions to be executed by processor 802. Main memory 804 also may be used for storing temporary variables or other intermediate information during execution of instructions by processor 802. Computer system 800 also includes a read only memory (ROM) and/or other static storage device 806 coupled to bus 801 for storing static information and instructions for processor 802. A data storage device 807, such as a magnetic disk or optical disk, is coupled to bus 801 for storing information and instructions.

Computer system 800 may also be coupled via bus 801 to a display device 821, such as a cathode ray tube (CRT), for displaying information to a computer user. An alphanumeric input device 822, including alphanumeric and other keys, is typically coupled to bus 801 for communicating information and command selections to processor 802. Another type of user input device is cursor control 823, such as a mouse, a trackball, or cursor direction keys for communicating direction information and command selections to processor 802 and for controlling cursor movement on display 821. This input device typically has two degrees of freedom in two axes, a first axis (e.g., x) and a second axis (e.g., y), which allows the device to specify positions in a plane.

Alternatively, other input devices 824, such as a fingerprint reader, a retina scanner and/or other biometric information measuring and/or acquiring devices may be included. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 822, in which case all interactions therewith may be carried out via alternative input devices, such as a stylus and the written text may be interpreted using optical character recognition (OCR) techniques, for example.

The present invention is related to the use of computer system 800 to provide methods and systems for a single sign-on authentication of buyers in a multi-seller e-commerce environment using Directory-authenticated bank drafts and for carrying out electronic transactions including contingency-dependent payments via secure electronic bank drafts. According to one embodiment, the methods according to the present invention are implemented by one or more computer systems 800 in response to processor(s) 802 executing sequences of instructions contained in memory 804. Such instructions may be read into memory 804 from another computer-readable medium, such as data storage device 807. Execution of the sequences of instructions contained in memory 804 causes processor(s) 802 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Indeed, those of skill in this art will recognize other alternative embodiments and all such embodiments are deemed to fall within the scope of the present invention. Thus, the present invention should be limited only by the claims as set forth below.

What is claimed is:

1. A computer-implemented method of carrying out an electronic transaction that includes a contingency-dependent payment via a secure electronic draft, comprising the steps of:
    establishing a secure computer site that is controlled by a bank and that is accessible only to authenticated parties to the transaction, the site being configured to provide a description of a contingency and to include an option to remove the contingency, the removal of the contingency being a precondition to the bank releasing payment on the draft to a payee of the draft;
    authenticating each party to the draft requesting access to the computer site by encrypting at least a portion of an identification information provided by the requesting party over a secure channel and successfully matching the encrypted identification information with a stored encrypted identifier that is unique to the requesting party, and
    releasing payment on the draft to the payee only when a drawer of the draft is successfully authenticated by the bank and when the option to remove the contingency is timely exercised by an authenticated party that is authorized to remove the contingency.

2. The method of claim 1, wherein each encrypted identifier is stored by a single bank.

3. The method of claim 1, wherein the authenticating step authenticates the party to the draft only for a session of limited duration.

4. The method of claim 1, wherein the drawer's encrypted identifier is linked to the drawer's financial information stored by the bank and wherein the bank accesses the stored financial information prior to the releasing step and withholds payment on the draft when insufficient finds or credit are available.

5. The method of claim 1, wherein the parties to the transaction access the secure computer site over a Virtual Private Network on the Internet.

6. The method of claim 1, further including the steps of:
    electronically notifying each party to the transaction of their requested participation in the transaction, and
    canceling the transaction unless each party to the transaction accesses the computer site, acknowledges receipt of the electronic notification, is authenticated and indicates their willingness to participate in the transaction.

7. The method of claim 6, wherein a fee is assessed upon at least releasing payment and canceling the transaction.

8. The method of claim 1, wherein each encrypted identifier includes an ID and encrypted password pair, the pair being stored in a data structure controlled by the bank and managed by Directory software.

9. The method of claim 8, wherein the identification information for each party to the transaction includes an ID for that party and an identification of the bank in which the encrypted identifier for that party is stored.

10. The method of claim 9, wherein the bank in which the encrypted identifier is stored carries out the steps of requesting a password corresponding to the provided identification information, encrypting the requested password and matching the ID and encrypted password with a stored encrypted identifier.

11. A computer-implemented method of securely carrying out an electronic transaction including a plurality of electronic drafts, a payment on at least one of the drafts being contingent upon removal of an associated contingency, the method comprising the steps of:
    establishing a secure computer site that is controlled by a trusted entity and that is accessible only by authenticated parties to the transaction and by any authenticated contingency approver, the site being configured to provide a representation of each of the plurality of drafts and an option to remove any contingencies associated therewith;
    authenticating parties and any contingency approver requesting access to the computer site by encrypting at least a portion of an identification information provided by the requesting party or contingency approver over a secure channel and successfully matching the encrypted identification information with a stored encrypted identifier, the stored encrypted identifier being unique to the requesting party or contingency approver, and
    releasing payment on a draft only when a drawer of the draft is authenticated and when the option to remove each contingency associated with the draft is timely exercised by an authenticated party or authenticated contingency remover that is authorized to remove the contingency.

12. The method of claim 11, further comprising the step of canceling the transaction unless payment is timely released on each of the plurality of drafts and each of the contingencies of the transaction is removed by an authenticated party or contingency remover.

13. The method of claim 11, wherein the authentication step includes a step of granting a permission level and wherein all or a selected portion of the representation of the transaction at the computer site is viewable to each authenticated party or contingency approver, depending upon the permission level granted.

14. The method of claim 11, wherein the authenticating step authenticates each party and each contingency approver for a session of limited duration.

15. The method of claim 11, wherein the encrypted identifier is linked to the drawer's financial information stored by the trusted entity and wherein the trusted entity accesses the stored financial information prior to the releasing step and withholds payment on the draft when insufficient funds or credit are available or when agreed transaction limits are exceeded.

16. The method of claim 11, wherein each party to the transaction and each contingency approver accesses the secure computer site over a Virtual Private Network on the Internet.

17. The method of claim 11, further comprising the steps of:
   electronically notifying each party to the transaction and each contingency approver of their requested participation in the transaction, and
   canceling the transaction unless each party to the transaction and each contingency approver acknowledges participation in the transaction by accessing the computer site, becomes authenticated and indicates their willingness to participate in the transaction.

18. The method of claim 11, further comprising the step of canceling the transaction and returning at least a portion of each payment released on each of the plurality of drafts of the transaction if any contingency associated with the transaction is not timely removed by an authenticated party or by an authenticated contingency remover that is authorized to remove the contingency.

19. The method of claim 11, wherein the trusted entity includes an entity having a financial and fiduciary relationship with at least one of the parties to the transaction.

20. The method of claim 19, wherein the trusted entity is a bank.

21. The method of claim 11, wherein the identification information is unrelated to data associated with a payment instrument.

22. The method of claim 21, wherein the data associated with the payment instrument is a credit card number.

23. The method of claim 11, wherein each encrypted identifier includes an ID and encrypted password pair, the pair being stored in data structure controlled by the trusted party and managed by Directory software.

24. The method of claim 23, wherein the identification information for each party to the transaction and each contingency approver includes an ID and an identification of the trusted party in which the encrypted identifier for that party or contingency approver is stored.

25. The method of claim 24, wherein the trusted party in which the encrypted identifier is stored carries out the steps of requesting a password corresponding to the provided identification information, encrypting the requested password and matching the ID and encrypted password with a stored encrypted identifier.

26. A machine-readable medium having data stored thereon representing sequences of instructions which, when executed by one or more computers coupled to a secure network, causes at least one of said computers to perform the steps of:
   establishing a secure computer site that is controlled by a bank and that is remotely accessible only by authenticated parties to the transaction and by any authenticated contingency approver over the secure network, the site including a representation of the transaction that includes a representation of each of the plurality of drafts and an option to remove any contingencies associated therewith;
   authenticating parties and any contingency approver requesting access to the computer site by encrypting at least a portion of an identification information provided by the requesting party or contingency approver over a secure channel and successfully matching the encrypted identification information with an encrypted identifier that is stored by a bank, the encrypted identifier being unique to the requesting party or contingency approver, and
   releasing payment on a draft of the transaction only when a drawer of the draft is authenticated and when the option to remove each contingency associated with the draft is timely exercised by an authenticated party or authenticated contingency remover that is authorized to remove the contingency.

27. The medium of claim 26, further comprising the step of canceling the transaction unless payment is timely released on each of the plurality of drafts and each of the contingencies of the transaction is removed by an authenticated party or contingency remover.

28. The medium of claim 26, wherein all or a selected portion of the representation of the transaction at the computer site is viewable to each authenticated party or contingency approver, depending upon a permission level.

29. The medium of claim 26, wherein the encrypted identifier of the drawer of the draft is linked to the drawer's financial information stored by the bank and wherein the bank accesses the stored financial information prior to the releasing step and withholds payment on the draft when insufficient funds or credit are available.

30. The medium of claim 26, wherein each party to the transaction and each contingency approver accesses the computer site over a Virtual Private Network over the Internet.

31. The medium of claim 26, wherein the secure channel includes a Secure Socket Layer (SSL).

32. The medium of claim 26, further comprising the steps of:
   electronically notifying each party to the transaction and each contingency approver of their requested participation in the transaction, and
   canceling the transaction with notice to each party unless each party to the transaction and each contingency approver acknowledges participation in the transaction by accessing the computer site, becomes authenticated and indicates their willingness to participate in the transaction.

33. The medium of claim 26, further comprising the step of canceling the transaction with notice to each party and returning at least a portion of each payment released on each of the plurality of drafts of the transaction if any contingency associated with the transaction is not timely removed by an authenticated party or by an authenticated contingency remover that is authorized to remove the contingency.

34. The medium of claim 26, wherein the identification information is unrelated to data associated with a payment instrument.

35. The medium of claim 34, wherein the data associated with the payment instrument is a credit card number.

36. The medium of claim 26, wherein each encrypted identifier includes an ID and encrypted password pair, the pair being stored in a data structure controlled by the bank and managed by Directory software.

37. The medium of claim 36, wherein the identification information for each party to the transaction and each contingency approver includes an ID for that party and an identification of the bank in which the encrypted identifier for that party or contingency approver is stored.

38. The medium of claim 37, wherein the bank in which the encrypted identifier is stored carried out the steps of requesting a password corresponding to the provided identification information, encrypting the requested password and matching the ID and encrypted password with a stored encrypted identifier.

39. A method of carrying out secure electronic transactions over the Internet, comprising the steps of:

establishing a secure network linking a plurality of participating banks;

storing an encrypted identifier for each participating account-holding customer in a customer's home bank, the customer's home bank being that bank of the plurality of banks in which the customer maintains an account;

linking each encrypted identifier to the customer's account;

requiring that each customer having caused an electronic draft to be presented to one of the plurality of banks be authenticated prior to releasing payment on the draft, a customer being authenticated when identification information presented by the customer matches the encrypted identifier stored at the customer's home bank, the encrypted identification information including an identification of the customer's home bank.

40. The method of claim 39, wherein the identification information includes a customer ID and wherein the method further includes the step of storing a local master list at each of the plurality of banks, the local master list stored at each bank including the ID of each customer having presented the identification information to that bank and the identification of the customer's home bank.

41. The method of claim 40, further comprising the step of forwarding the identification presented by the customer to the customer's home bank over the secure network for authentication when the bank to which the identification information is presented is other than the customer's home bank.

42. The method of claim 39, wherein the draft includes a contingency, a timely removal thereof by an appropriate authenticated party to the transaction being a precondition to the release of the payment on the draft.

43. The method of claim 42, further comprising the step of establishing a secure computer site controlled by one of the plurality of banks, the secure computer site being accessible only to authenticated parties to the transaction and including a representation of the transaction and an option to remove the contingency.

44. The method of claim 39 wherein the identification information is unrelated to data associated with a payment instrument.

45. The method of claim 44, wherein the data associated with the payment instrument is a credit card number.

* * * * *

UNITED STATES PATENT AND TRADEMARK OFFICE
CERTIFICATE OF CORRECTION

PATENT NO.   : 6,529,885 B1
DATED        : March 4, 2003
INVENTOR(S)  : Johnson

It is certified that error appears in the above-identified patent and that said Letters Patent is hereby corrected as shown below:

<u>Column 28,</u>
Line 5, "finds" should be -- funds --.

<u>Column 31,</u>
Line 9, "carrie*d*" should be -- carries --.

Signed and Sealed this

Twenty-second Day of April, 2003

JAMES E. ROGAN
*Director of the United States Patent and Trademark Office*